United States Patent
Dhanda et al.

(10) Patent No.: US 11,178,617 B2
(45) Date of Patent: Nov. 16, 2021

(54) WAKEUP SIGNAL GROUPING

(71) Applicant: QUALCOMM Incorporated, San Diego, CA (US)

(72) Inventors: Mungal Singh Dhanda, Slough (GB); Haris Zisimopoulos, London (GB); Umesh Phuyal, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/776,409

(22) Filed: Jan. 29, 2020

(65) Prior Publication Data

US 2020/0245246 A1 Jul. 30, 2020

(30) Foreign Application Priority Data

Jan. 30, 2019 (GR) .............................. 20190100051

(51) Int. Cl.
*H04W 52/02* (2009.01)
*H04W 60/00* (2009.01)
(Continued)

(52) U.S. Cl.
CPC ... *H04W 52/0229* (2013.01); *H04W 52/0219* (2013.01); *H04W 60/00* (2013.01); *H04W 68/005* (2013.01); *H04W 76/11* (2018.02)

(58) Field of Classification Search
CPC ......... H04W 52/0229; H04W 52/0219; H04W 60/00; H04W 76/11; H04W 68/005;
(Continued)

(56) References Cited

U.S. PATENT DOCUMENTS 9,516,592 B2 12/2016 Kwon et al.
2018/0359704 A1 12/2018 Li et al.
(Continued)

FOREIGN PATENT DOCUMENTS

WO 2018175760 A1 9/2018
WO 2018204799 A1 11/2018

OTHER PUBLICATIONS

Vikhrova, Olga, et al. "Performance analysis of paging strategies and data delivery approaches for supporting group-oriented IoT traffic in 5G networks." 2019 IEEE International Symposium on Broadband Multimedia Systems and Broadcasting (BMSB). IEEE, 2019. (Year: 2019).*

(Continued)

*Primary Examiner* — Sharad Rampuria
(74) *Attorney, Agent, or Firm* — Harrity & Harrity, LLP; Nerrie M. Zohn

(57) ABSTRACT

A wakeup signal (WUS) group that may be divided into WUS sub-groups, criteria or metrics for dividing the WUS group into a set of WUS sub-groups, and signaling or messaging to support the division of the WUS group into the set of WUS sub-groups are provided. For example, a set of UEs may be divided into WUS sub-groups based at least in part on respective frequencies of occurrence of paging occasions for the set of UEs (e.g., based at least in part on traffic type, observations regarding past paging occasions, predictions regarding future paging occasions, and/or the like) and/or based at least in part on other considerations. Furthermore, some techniques and apparatuses described herein provide for the mapping of network device-level WUS sub-groups (e.g., supported by a network device such as an MME) to base station-level WUS sub-groups (e.g., supported by a base station).

104 Claims, 12 Drawing Sheets

(51) Int. Cl.
*H04W 76/11* (2018.01)
*H04W 68/00* (2009.01)

(58) Field of Classification Search
CPC ............. H04W 76/27; H04W 52/0216; H04W 52/0235; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

2020/0029302 A1 1/2020 Cox et al.
2021/0037470 A1* 2/2021 Strom ............... H04W 52/0235

OTHER PUBLICATIONS

Vikhrova, Olga, et al. "Group-oriented services for critical machine type communications in 5G networks." 2018 IEEE 29th Annual International Symposium on Personal, Indoor and Mobile Radio Communications (PIMRC). IEEE, 2018. (Year: 2018).*
Intel Corporation: "Configurations of Wake-up Signal for feNB-IoT", 3GPP TSG RAN WG1 Meeting #90bis, R1-1717344, Prague, Czech Republic, Oct. 9-13, 2017, 4 pages.
Nokia et al., "Analysis of Group WUS Options", 3GPP TSG-RAN WG2 Meeting #104, R2-1817048, Spokane, USA, Nov. 12-16, 2018, 5 pages.
International Search Report and Written Opinion—PCT/US2020/015882—ISA/EPO—dated May 7, 2020.

* cited by examiner

WAKEUP SIGNAL GROUPING

CROSS-REFERENCE TO RELATED APPLICATION

This application claims priority to Greek Application No. 20190100051, filed on Jan. 30, 2019, entitled "WAKEUP SIGNAL GROUPING," which is hereby expressly incorporated by reference herein.

BACKGROUND

Field

Aspects of the present disclosure generally relate to wireless communication and to techniques and apparatuses for wakeup signal grouping.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Paging is a procedure used to notify an idle-mode UE (e.g., a radio resource control (RRC) idle mode UE, an Evolved Packet Service (EPS) Connection Management (ECM) idle mode UE, and/or the like) that the UE is to initiate a mobile-terminated call, reacquire system information, provide an Earthquake and Tsunami Warning System (EWTS) indication, and/or the like. One example of a paging message is the S1-AP paging message, in accordance with the S1-AP protocol defined by 3GPP Technical Specification 36.413. Not all paging may be pertinent to all UEs covered by a cell. A base station may perform paging based at least in part on an indication from a network device, such as a mobility management entity (MME), that is associated with a tracking area of a UE that is to receive a page.

A wakeup signal (WUS) may be used to improve battery efficiency of UEs or other devices subject to paging. For example, it may be power-inefficient to monitor paging occasions when a particular UE is not to receive paging, and not all UEs covered by a cell may be the intended recipients of a particular paging message. When using a WUS, a UE may not awaken for a paging occasion unless the UE has received a WUS corresponding to the wakeup occasion. The UEs assigned to a particular paging occasion and thus associated with a same WUS may be referred to as belonging to a WUS group.

However, there may be space for further improvement with the use of WUS groups. For example, not all UEs associated with a same paging occasion (and therefore part of a same WUS group) may be the intended recipient of a paging message. In such a case, if a WUS is provided for the WUS group of the paging occasion, some UEs might awaken and monitor the paging occasion for a paging message that is not relevant to these UEs. Furthermore, different base stations may support different numbers of WUS sub-groups, which may create compatibility issues in a tracking area (which may include multiple base stations) serviced by a network device (e.g., a mobility management entity), which may support the same number of WUS sub-groups as a base station, or may be associated with a different number of WUS sub-groups than the base station.

Some techniques and apparatuses described herein provide the division of a WUS group into WUS sub-groups, criteria or metrics for dividing the WUS group into a set of WUS sub-groups, and signaling or messaging to support the division of the WUS group into the set of WUS sub-groups. For example, some techniques and apparatuses described herein provide the division of a set of UEs into WUS sub-groups based at least in part on respective frequencies of occurrence of paging occasions for the set of UEs (e.g., based at least in part on traffic type, observations regarding past paging occasions, predictions regarding future paging occasions, and/or the like) and/or based at least in part on other considerations. Furthermore, some techniques and apparatuses described herein provide for the mapping of network device-level WUS sub-groups or WUS groups (e.g., a number of WUS sub-groups supported by a network device such as an MME) to base station-level WUS subgroups or WUS groups (e.g., a number of WUS sub-groups supported by a base station). This may alleviate incompatibility issues when different base stations of a tracking area support different numbers of base station-level WUS sub-groups.

Thus, UE power efficiency may be improved by WUS sub-grouping based at least in part on respective frequencies of occurrence of paging occasions. Furthermore, incompatibility at the tracking area level may be reduced by mapping of base station-level WUS sub-groups to network device-level WUS sub-groups, thereby further improving efficiency of the network in comparison to using a one-size-fits-all approach for WUS sub-grouping irrespective of base station capabilities, as described in more detail elsewhere herein.

In an aspect of the disclosure, a method, a user equipment (UE), a base station, an apparatus, and a computer program product are provided.

In some aspects, the method may by performed by a network device. The method may include providing, to a base station, information identifying a set of WUS sub-groups for wakeup signaling by the base station, wherein the information identifying the set of WUS sub-groups identifies a mapping of a set of base station-level WUS sub-groups to a set of network device-level WUS sub-groups; receiving an indication that a UE supports WUS sub-grouping; providing, to the UE and based at least in part on receiving an indication that the UE supports WUS sub-grouping, information identifying an assignment of the UE to a WUS sub-group of the set of WUS sub-groups; and providing, to the base station, an indication that the WUS sub-group to which the UE is assigned is to receive a WUS based at least in part on the assignment and on paging to be performed for the UE.

In some aspects, the network device may include a memory and one or more processors operatively coupled to the memory. The memory and the one or more processors may be configured to provide, to a base station, information identifying a set of WUS sub-groups for wakeup signaling by the base station, wherein the information identifying the set of WUS sub-groups identifies a mapping of a set of base station-level WUS sub-groups to a set of network device-level WUS sub-groups; receive an indication that a UE supports WUS sub-grouping; provide, to the UE and based at least in part on receiving an indication that the UE supports WUS sub-grouping, information identifying an assignment of the UE to a WUS sub-group of the set of WUS sub-groups; and provide, to the base station, an indication that the WUS sub-group to which the UE is assigned is to receive a WUS based at least in part on the assignment and on paging to be performed for the UE.

In some aspects, the apparatus may include means for providing, to a base station, information identifying a set of WUS sub-groups for wakeup signaling by the base station, wherein the information identifying the set of WUS sub-groups identifies a mapping of a set of base station-level WUS sub-groups to a set of network device-level WUS sub-groups; means for receiving an indication that a UE supports WUS sub-grouping; means for providing, to the UE and based at least in part on receiving an indication that the UE supports WUS sub-grouping, information identifying an assignment of the UE to a WUS sub-group of the set of WUS sub-groups; and means for providing, to the base station, an indication that the WUS sub-group to which the UE is assigned is to receive a WUS based at least in part on the assignment and on paging to be performed for the UE In some aspects, the computer program product may include a non-transitory computer-readable medium storing one or more instructions. The one or more instructions, when executed by one or more processors of a network device, may cause the one or more processors to provide, to a base station, information identifying a set of WUS sub-groups for wakeup signaling by the base station, wherein the information identifying the set of WUS sub-groups identifies a mapping of a set of base station-level WUS sub-groups to a set of network device-level WUS sub-groups; receive an indication that a UE supports WUS sub-grouping; provide, to the UE and based at least in part on receiving an indication that the UE supports WUS sub-grouping, information identifying an assignment of the UE to a WUS sub-group of the set of WUS sub-groups; and provide, to the base station, an indication that the WUS sub-group to which the UE is assigned is to receive a WUS based at least in part on the assignment and on paging to be performed for the UE.

In some aspects, the method may by performed by a base station. The method may include receiving, from a network device, information identifying a set of WUS sub-groups for wakeup signaling by the base station, wherein the information identifying the set of WUS sub-groups identifies a mapping of a set of base station-level WUS sub-groups to a set of network device-level WUS sub-groups; receiving an indication that a WUS sub-group, of the set of WUS sub-groups, associated with a UE is to receive a WUS based at least in part on paging to be performed for the UE, wherein the WUS sub-group is a network device-level WUS sub-group that is mapped to two or more base station-level WUS sub-groups; and transmitting the WUS on a WUS occasion associated with a selected base station-level WUS sub-group of the two or more base station-level WUS sub-groups in accordance with the mapping.

In some aspects, the base station may include a memory and one or more processors operatively coupled to the memory. The memory and the one or more processors may be configured to receive, from a network device, information identifying a set of WUS sub-groups for wakeup signaling by the base station, wherein the information identifying the set of WUS sub-groups identifies a mapping of a set of base station-level WUS sub-groups to a set of network device-level WUS sub-groups; receive an indication that a WUS sub-group, of the set of WUS sub-groups, associated with a UE is to receive a WUS based at least in part on paging to be performed for the UE, wherein the WUS sub-group is a network device-level WUS sub-group that is mapped to two or more base station-level WUS sub-groups; and transmit the WUS on a WUS occasion associated with a selected base station-level WUS sub-group of the two or more base station-level WUS sub-groups in accordance with the mapping.

In some aspects, the apparatus may include means for receiving, from a network device, information identifying a set of WUS sub-groups for wakeup signaling by the apparatus, wherein the information identifying the set of WUS sub-groups identifies a mapping of a set of base station-level WUS sub-groups to a set of network device-level WUS sub-groups; means for receiving an indication that a WUS sub-group, of the set of WUS sub-groups, associated with a UE is to receive a WUS based at least in part on paging to be performed for the UE, wherein the WUS sub-group is a network device-level WUS sub-group that is mapped to two or more base station-level WUS sub-groups; and means for transmitting the WUS on a WUS occasion associated with a selected base station-level WUS sub-group of the two or more base station-level WUS sub-groups in accordance with the mapping.

In some aspects, the computer program product may include a non-transitory computer-readable medium storing one or more instructions. The one or more instructions, when executed by one or more processors of a base station, may cause the one or more processors to receive, from a network device, information identifying a set of WUS sub-groups for wakeup signaling by the base station, wherein the information identifying the set of WUS sub-groups identifies a mapping of a set of base station-level WUS sub-groups to a set of network device-level WUS sub-groups; receive an indication that a WUS sub-group, of the set of WUS sub-groups, associated with a UE is to receive a WUS based at least in part on paging to be performed for the UE, wherein the WUS sub-group is a network device-level WUS sub-group that is mapped to two or more base station-level WUS sub-groups; and transmit the WUS on a WUS occasion associated with a selected base station-level WUS sub-group of the two or more base station-level WUS sub-groups in accordance with the mapping.

In some aspects, the method may by performed by a UE. The method may include providing, for a network device, an indication that the UE supports WUS sub-grouping; receiving, based at least in part on the indication, information identifying an assignment of the UE to a WUS sub-group of a set of WUS sub-groups, wherein the WUS sub-group is a network device-level WUS sub-group that is associated with a mapping to a base station-level WUS sub-group; and receiving a WUS on a WUS occasion associated with the base station-level WUS sub-group based at least in part on the mapping.

In some aspects, the UE may include a memory and one or more processors operatively coupled to the memory. The memory and the one or more processors may be configured to provide, for a network device, an indication that the UE supports WUS sub-grouping; receive, based at least in part on the indication, information identifying an assignment of the UE to a WUS sub-group of a set of WUS sub-groups, wherein the WUS sub-group is a network device-level WUS sub-group that is associated with a mapping to a base station-level WUS sub-group; and receive a WUS on a WUS occasion associated with the base station-level WUS sub-group based at least in part on the mapping.

In some aspects, the apparatus may include means for providing, for a network device, an indication that the apparatus supports WUS sub-grouping; receiving, based at least in part on the indication, information identifying an assignment of the apparatus to a WUS sub-group of a set of WUS sub-groups, wherein the WUS sub-group is a network device-level WUS sub-group that is associated with a mapping to a base station-level WUS sub-group; and means for receiving a WUS on a WUS occasion associated with the base station-level WUS sub-group based at least in part on the mapping.

In some aspects, the computer program product may include a non-transitory computer-readable medium storing one or more instructions. The one or more instructions, when executed by one or more processors of a UE, may cause the one or more processors to provide, for a network device, an indication that the UE supports WUS sub-grouping, wherein the WUS sub-group is a network device-level WUS sub-group that is associated with a mapping to a base station-level WUS sub-group; receive, based at least in part on the indication, information identifying an assignment of the UE to a WUS sub-group of a set of WUS sub-groups; and receive a WUS on a WUS occasion associated with the base station-level WUS sub-group based at least in part on the mapping.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
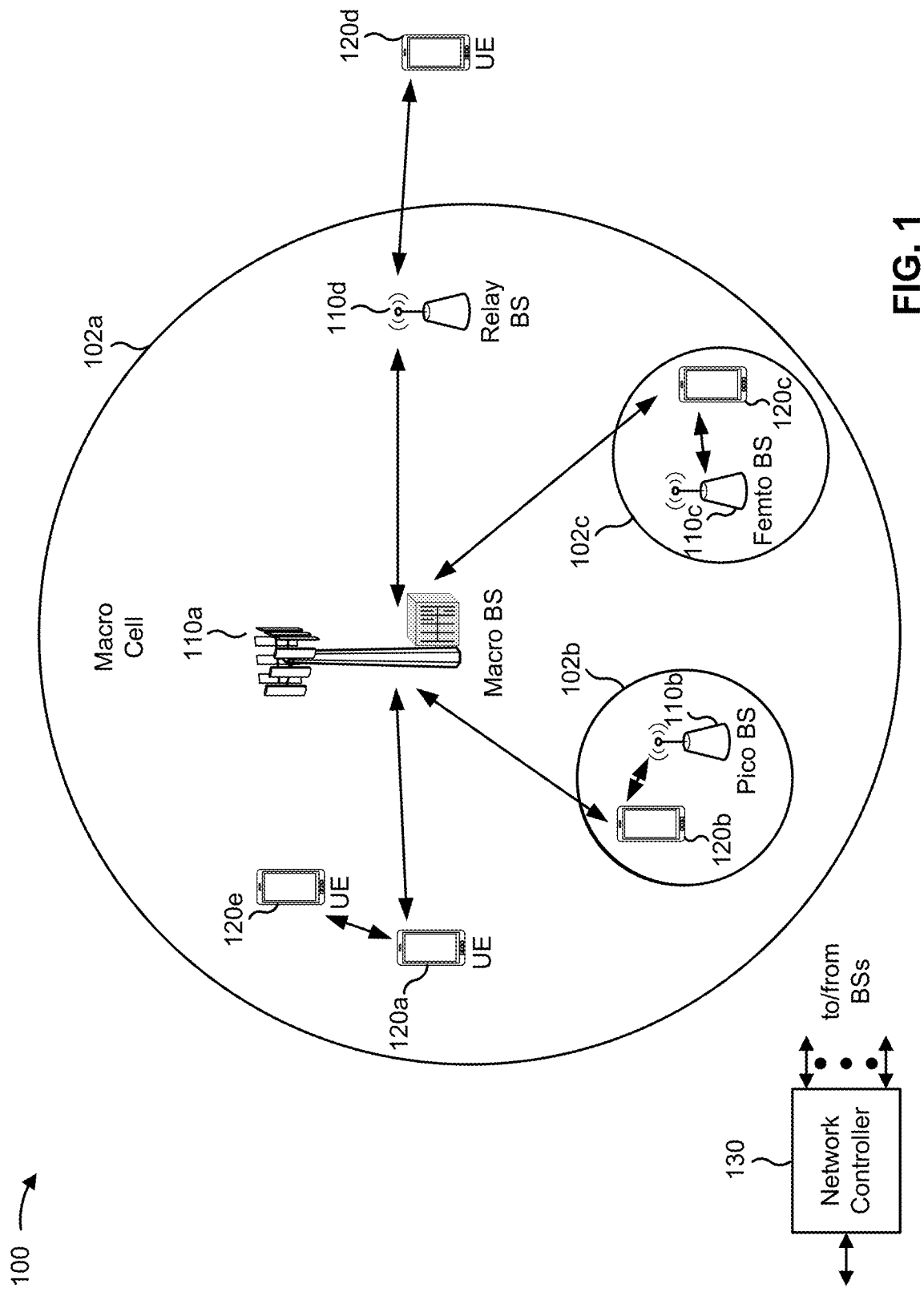
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

In some aspects, a core network may handle mobility, paging, and/or other concerns for UE 120 and/or BS 110. For example, a network device of the core network may handle mobility for UEs 120 of a particular tracking area. One example of such a network device is the mobility management entity, although other devices may perform these functions.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular Radio Access Technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
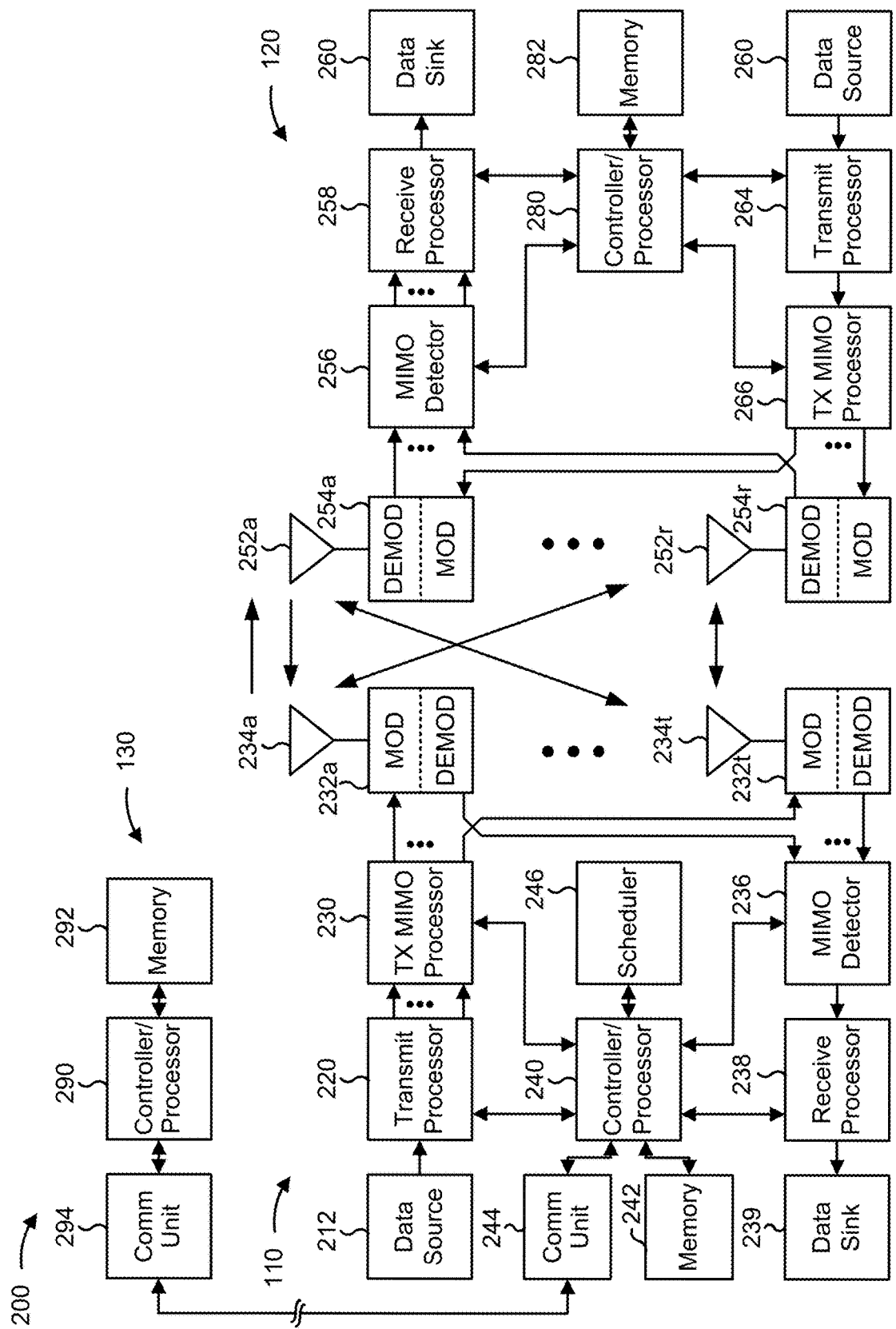
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240.

Base station 110 may include communication unit 244 and communicate to network controller 130 via communication unit 244. Network controller 130 may include communication unit 294, controller/processor 290, and memory 292. In some aspects, network controller 130 may include or be associated with a network device (e.g., an MME and/or the like). The MME may include a controller/processor and one or more memories.

Controller/processor 240 of base station 110, controller/processor 280 of UE 120, and/or any other component(s) of FIG. 2 may perform one or more techniques associated with WUS sub-group signaling, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 700 of FIG. 7, method 1000 of FIG. 10, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
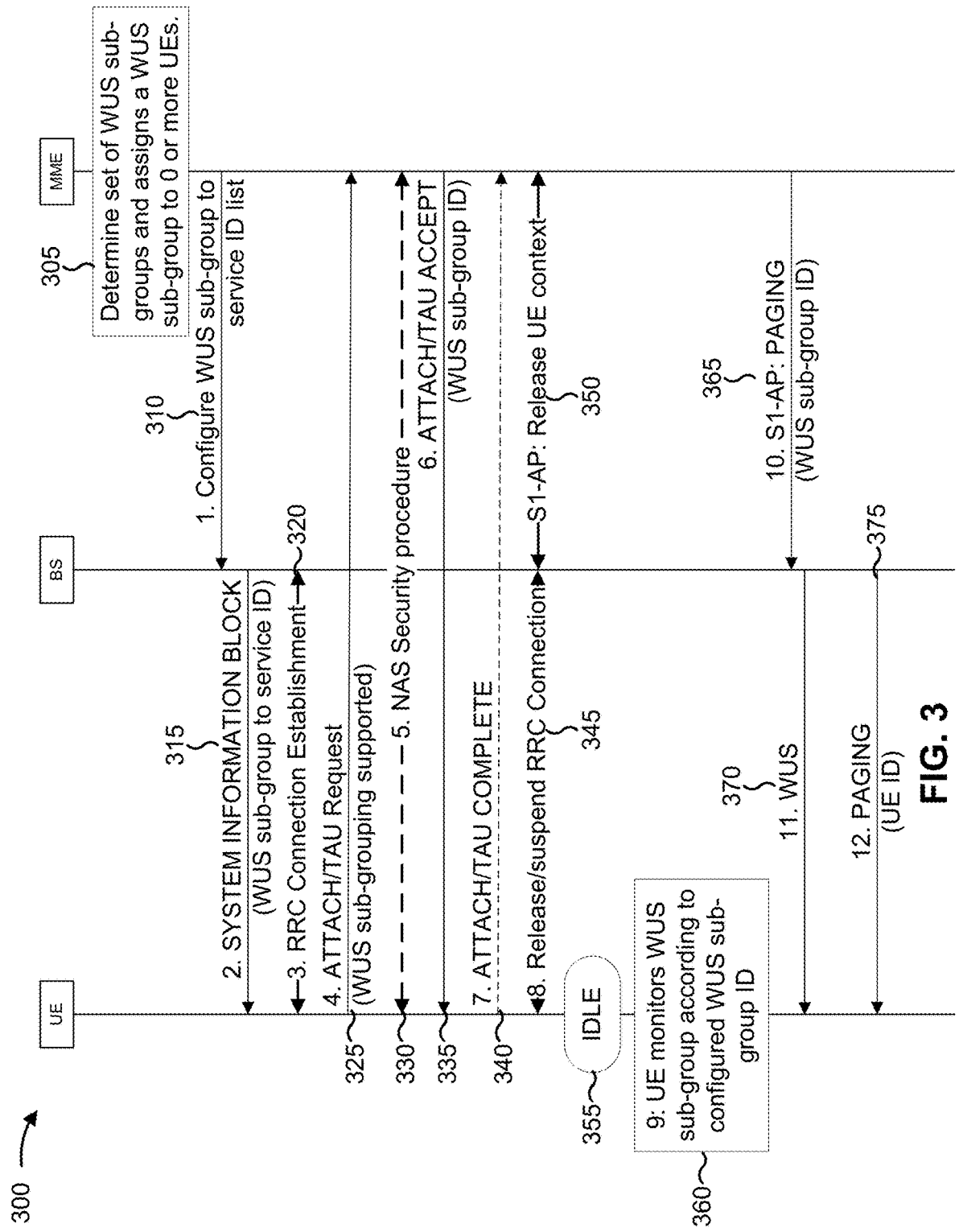
FIG. 3 is a diagram illustrating an example of WUS sub-grouping.

FIG. 3 is a diagram illustrating an example 300 of WUS sub-grouping. As shown, FIG. 3 includes a UE (e.g., UE 120), a base station (e.g., BS 110), and an MME. The MME may be a network device, such as a core network device, a network controller (e.g., network controller 130), and/or the like. The techniques and apparatuses described herein are not limited to those in which an MME is the device that performs the actions described as being performed by the MME. In other words, any network device may perform the actions described as being performed by the MME.

As shown in FIG. 3, and by reference number 305, the MME may determine a set of WUS sub-groups to be used for wakeup signaling by a base station. For example, the MME may determine how many base station-level WUS sub-groups are to be included in the set of WUS sub-groups. In some aspects, the MME may determine the set of WUS sub-groups based at least in part on a capability of the base station. For example, the MME may determine the set of WUS sub-groups to be equal to the number of base station-level WUS sub-groups supported by the base station. A base station-level WUS sub-group may refer to a WUS group used by the base station to perform wakeup signaling for UEs of the WUS group. For example, a base station may divide a group of UEs into a plurality of WUS groups, and each WUS group may be referred to as a base station-level WUS sub-group.

In some aspects, the MME may determine a configuration of the set of WUS sub-groups. For example, the MME may determine how UEs are to be divided into the set of WUS sub-groups and/or may determine particular criteria for dividing the UEs into WUS sub-groups. As a more particular example, when the WUS sub-groups are based on frequency of occurrence of paging messages for the UE, the MME may determine that a first group of UEs with a first frequency of occurrence of paging messages are to be grouped in a first WUS sub-group, that a second group of UEs with a second frequency of occurrence of paging messages are to be grouped in a second WUS sub-group, and so on. This frequency of occurrence may be based at least in part on an observed frequency of paging or an expected frequency of paging.

In some aspects, the MME may determine a mapping of MME-level WUS sub-groups to base station-level WUS sub-groups. An MME-level WUS sub-group (also referred to herein as a network device-level WUS sub-group) may refer to a WUS group used by an MME to perform wakeup signaling or trigger wakeup signaling by a BS. For example, an MME-level WUS sub-group may be associated with a probability bucket, a frequency of paging, or another type of group. For example, the MME may use a particular number of MME-level WUS sub-groups (e.g., any integer number of WUS sub-groups), whereas different base stations associated with the MME may use different numbers of WUS sub-groups. The MME may determine how MME-level WUS sub-groups are to be mapped to base station-level WUS sub-groups, and may provide information indicating the mapping. Thus, when the MME provides an indication to the base station that a UE belonging to a particular MME-level WUS sub-group is to be paged, the base station can determine which base station-level WUS sub-group to page. In one example, the MME-level or network-level WUS sub-groups may be associated with respective buckets within MME-level or network-level WUS sub-groups based at least in part on probability of paging or frequency of paging, and the base station-level WUS sub-groups may be WUS groups. When base station-level WUS groups are mapped to network-level WUS-sub-groups, the base station WUS groups may be considered sub-groups in connection with the mapping enabling the base station WUS groups to provide a functionality of WUS sub-groups.

In some aspects, the number of MME-level WUS sub-groups may be the same as the number of base station-level WUS sub-groups. In some aspects, the number of MME-level WUS sub-groups may be different from the number of base station-level WUS sub-groups. For example, the number of MME-level WUS sub-groups may be higher than or lower than the number of base station-level WUS sub-groups. In the case when there are more MME-level WUS sub-groups than base station-level WUS sub-groups, the MME and/or the base station may determine a mapping of the MME-level WUS sub-groups to the base station-level WUS sub-groups, with at least two MME-level WUS sub-groups mapped to a base station-level WUS sub-group. In some aspects, the MME may map multiple base station-level WUS sub-groups to a single MME-level sub-group. In this case, when a UE is associated with a particular MME-level WUS sub-group that is mapped to two or more base station-level WUS sub-groups, the ambiguity in base station-level WUS sub-group may be resolved based at least in part on an identifier of the UE.

An example table of such mappings is provided below. In the first example mapping, two MME-level WUS sub-groups are mapped to BS-level WUS sub-group 1. In the second example mapping, a highest two MME-level WUS sub-groups (according to index) are mapped to a highest BS-level WUS sub-group. In the third example mapping, a lowest and a highest MME-level WUS sub-group (according to index) are mapped to a lowest BS-level WUS sub-group.

| MME WUS sub-group ID | BS WUS sub-group ID mapping 1 | BS WUS sub-group ID mapping 2 | BS WUS sub-group ID mapping 3 |
|---|---|---|---|
| 0 | 0 | 0 | 0 |
| 1 | 1 | 1 | 1 |
| 2 | 1 | 2 | 2 |
| 3 | 2 | 3 | 3 |
| 4 | 3 | 3 | 0 |

In some aspects, the MME may determine a rule for mapping the MME-level WUS sub-groups to the base station-level WUS sub-groups. For example, the MME may determine which of the above approaches is to be used, or may determine a different approach for mapping the MME-level WUS sub-groups to the base station-level WUS sub-groups. In such a case, the MME may provide information indicating the rule to the base station, and the base station may determine the mapping of MME-level WUS sub-groups to base station-level WUS sub-groups. This may conserve signaling resources of the MME that would otherwise be used to explicitly signal the mapping.

As shown by reference number 310, the MME may provide information identifying the set of WUS sub-groups for wakeup signaling by the base station. For example, the MME may provide information identifying a set of MME-level WUS sub-groups, a set of base station-level WUS sub-groups, a mapping of MME-level WUS sub-groups to base station-level WUS sub-groups, a rule or configuration for mapping MME-level and base station-level WUS sub-groups, WUS occasions and/or paging occasions corresponding to the set of WUS sub-groups, and/or the like. In some aspects, the information identifying the set of WUS sub-groups may identify a list of WUS sub-group identifiers (e.g., service identifiers of the base station or the MME). In some aspects, the information identifying the set of WUS sub-groups may identify criteria for assigning UEs to WUS sub-groups. For example, in the case when the base station determines which WUS sub-group is to be paged for a particular UE, the information identifying the set of WUS sub-groups may identify how UEs are to be assigned to WUS sub-groups.

As shown by reference number 315, the base station may provide system information to the UE. For example, the base station may provide the system information to all UEs covered by the base station. As further shown, the system information may identify the set of WUS sub-groups. For example, the system information may identify the base station-level WUS sub-groups configured for the base station by the MME. In some aspects, the system information may provide information enabling the UE to identify a WUS sub-group to which the UE is assigned or is to be assigned, such as based at least in part on a value associated with the UE (e.g., a paging probability, a frequency of paging, and/or the like). In some aspects, the system information may identify a paging probability or a frequency of paging for the UE.

As shown by reference number 320, the UE may perform radio resource control (RRC) connection establishment with the base station. Accordingly, and as shown by reference number 325, the UE may provide a registration message or a registration update message, which may include an attach request message, a tracking area update request message, a registration request message, and/or the like. As further shown, the registration message or the registration update message may indicate that the UE supports WUS sub-grouping (e.g., based at least in part on one or more bit values of the attach request message or the tracking area update message). Accordingly, the MME may assign the UE to one of the MME-level WUS sub-groups (not shown). In some aspects, the MME may determine which base station-level WUS sub-group the UE is to be assigned to based at least in part on the MME-level WUS sub-group (e.g., using the mapping described above), depending on whether paging for the UE is to be indicated to the base station using the MME-level WUS sub-group or the base station-level WUS sub-group. The registration message or registration update message may include a message associated with 4G/LTE, a message associated with 5G/NR, and/or the like.

As shown by reference number 330, the UE and the MME may perform a non-access stratum (NAS) security procedure as part of the RRC connection establishment procedure. In some aspects, the UE and the MME may perform a different type of security procedure, such as an access stratum security procedure. As shown by reference number 335, the MME may provide, to the UE and via the base station, a registration message or a registration update message, such as an attach accept message, a tracking area update accept message, a registration accept message, and/or the like. As further shown, the attach accept message or the tracking area update accept message may identify which WUS sub-group is assigned to the UE (e.g., which base station-level WUS sub-group identifier or MME-level WUS sub-group identifier is assigned to the UE). Thus, the MME may indicate the WUS sub-group to which the UE is assigned so that the UE can monitor the appropriate WUS occasion.

As shown by reference number 340, the UE may determine that attaching or tracking area updating is complete. Accordingly, as shown by reference number 345, the UE may release or suspend the RRC connection. As shown by reference number 350, the MME may release an S1-AP context of the UE with the base station.

As shown by reference number 355, the UE may be in idle mode after releasing the RRC connection. Accordingly, as shown by reference number 360, the UE may monitor a WUS occasion corresponding to the WUS sub-group configured for the UE. In some aspects, the UE may determine a WUS occasion based at least in part on a base station-level WUS sub-group of the UE. For example, the UE may identify the base station-level WUS sub-group based at least in part on being configured with the base station-level WUS sub-group as described in connection with reference number 335, or may identify the base station-level WUS sub-group based at least in part on being configured with the MME-level WUS sub-group and using information identifying the mapping.

As shown by reference number 365, the MME may provide, to the base station, an indication that paging is to be performed for a particular MME-level WUS sub-group. For example, the indication may be an S1-AP message indicating that paging is to be performed for a WUS sub-group associated with a particular identifier. In some aspects, the MME may determine that a particular UE or set of UEs is to be paged, and may identify an MME-level WUS sub-group of the particular UE or set of UEs based at least in part on having assigned the particular UE or set of UEs to the MME-level WUS sub-group as part of RRC connection establishment. The MME may provide the indication that paging is to be performed for the particular MME-level WUS sub-group since the base station may have information identifying the mapping of the particular MME-level WUS sub-group to a base station-level WUS sub-group, so the base station can determine which BS-level WUS sub-group is to be paged using the mapping.

As shown by reference number 370, the base station may provide a WUS for the UE based at least in part on the indication that paging is to be performed. For example, the base station may identify a WUS occasion corresponding to the BS-level WUS sub-group associated with the MME-level WUS sub-group indicated by the MME, and may transmit a WUS on the WUS occasion. Since the UE monitors the WUS occasion associated with the base station-level WUS sub-group, the UE may detect the WUS, and may monitor a corresponding paging occasion. Accordingly, the UE may detect the paging message shown by reference number 375. For example, the UE may determine that the paging message is directed to the UE (e.g., based at least in part on a UE identifier of the UE), and may perform an action accordingly. In some aspects, the UE may perform a packet-switched call, a circuit-switched call, an RRC connection activation procedure, and/or the like based at least in part on the paging occasion. In this way, an MME may determine an MME-to-base-station mapping for WUS sub-groups, and may provide wakeup signaling based at least in part on WUS sub-groups in accordance with paging frequency and/or other concerns. Thus, UE power efficiency and air interface resource efficiency may be improved relative to WUS grouping in accordance with a paging occasion and/or the like.

As indicated above, FIG. 3 is provided as an example. Other examples may differ from what is described with respect to FIG. 3.

Figure 4:
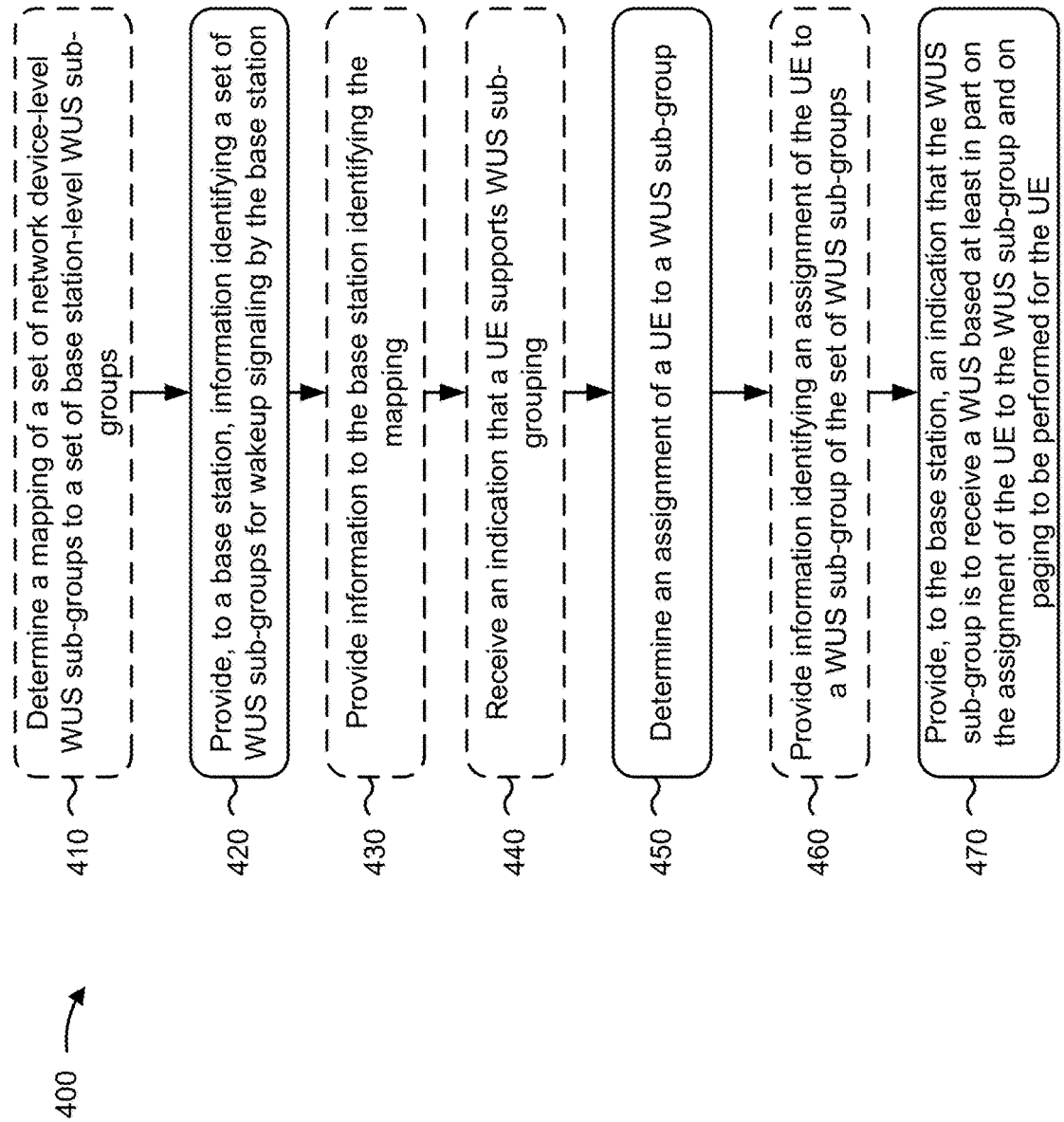
FIG. 4 is a flow chart of a method of wireless communication.

FIG. 4 is a flow chart of a method 400 of wireless communication. The method may be performed by a network device (e.g., the network controller 130, the MME of FIG. 3, the apparatus 502/502' of FIGS. 5 and 6, and/or the like).

At 410, the network device may optionally (as indicated by the dashed lines) determine a mapping of a set of network device-level WUS sub-groups to a set of base station-level WUS subgroups. For example, the base station may support a set of base station-level WUS sub-groups and the network device may support a set of network device-level WUS sub-groups. The network device (e.g., using controller/processor 240/280/290 and/or the like) may determine a mapping of a set of network device-level WUS sub-groups (e.g., MME-level WUS sub-groups) (or WUS groups) to a set of base station-level WUS sub-groups (or WUS groups), as described in more detail elsewhere herein. In some aspects, the set of network device-level WUS sub-groups is different than the set of base station-level WUS sub-groups. For example, the set of network device-level WUS sub-groups may be of a different size than the set of base station-level WUS sub-groups, or may be the same size and may include different sub-groups.

At 420, the network device may provide, to a base station, information identifying a set of WUS sub-groups for wakeup signaling by the base station. For example, the network device (e.g., using communication unit 294, controller/processor 240/280/290, and/or the like) may provide, to a base station (e.g., BS 110), information identifying a set of WUS sub-groups for wakeup signaling by the base station. In some aspects, the set of WUS sub-groups correspond to a plurality of WUS occasions.

At 430, the network device may optionally provide information to the base station identifying the mapping. For example, the network device (e.g., using communication unit 294, controller/processor 240/280/290, and/or the like) may provide information to the base station identifying the mapping. In some aspects, the network device may provide information identifying a rule for determining a mapping, and the base station may determine the mapping based at least in part on the rule.

At 440, the network device may optionally receive an indication that a UE supports WUS sub-grouping. For example, the network device (e.g., using communication unit 294, controller/processor 240/280/290, and/or the like) may receive the indication from the UE via the base station. In some aspects, the indication that the UE supports WUS sub-grouping is received in an attach request message or a tracking area update request message.

At 450, the network device may determine an assignment of a UE to a WUS sub-group. For example, the network device (e.g., using controller/processor 240/280/290 and/or the like) may determine an assignment of a UE (e.g., UE 120) to a WUS sub-group of the set of WUS sub-groups. In some aspects, determining the assignment of the UE to the WUS sub-group is based at least in part on a frequency of occurrence of paging (or a probability of paging) associated with the UE.

At 460, the network device may optionally provide information identifying the assignment of the UE to the WUS sub-group of the set of WUS sub-groups. For example, the network device (e.g., using communication unit 294, controller/processor 240/280/290, and/or the like) may provide information identifying the assignment of the UE to the WUS sub-group. In some aspects, the assignment indicates a base station-level WUS sub-group of the set of base station-level WUS sub-groups. In some aspects, the assignment indicates a network device-level WUS sub-group of the set of network device-level WUS sub-groups. In some aspects, the network device may provide the information identifying the assignment based at least in part on receiving an indication that the UE supports WUS sub-grouping. In some aspects, the indication that the UE supports WUS sub-grouping is received in a registration message or a registration update message. In some aspects, the information identifying the assignment is provided in an attach accept message or a tracking area update accept message.

At 470, the network device may provide, to the base station, an indication that the WUS sub-group is to receive a WUS based at least in part on the assignment of the UE to the WUS sub-group and on paging to be performed by the UE. For example, the network device (e.g., using communication unit 294, controller/processor 240/280/290, and/or the like) may provide, to the base station, an indication that the WUS sub-group is to receive a WUS based at least in part on the assignment. The network device may provide the indication based at least in part on paging to be performed by the UE that is assigned to the WUS sub-group. In some aspects, the indication that the WUS sub-group is to receive the WUS identifies a base station-level WUS sub-group of the set of base station-level WUS sub-groups. In some aspects, the indication, that the WUS sub-group is to receive the WUS, identifies a network device-level WUS sub-group of the set of network device-level WUS sub-groups.

Method 400 may include additional aspects, such as any single aspect or any combination of aspects described above and/or in connection with one or more other processes described elsewhere herein.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
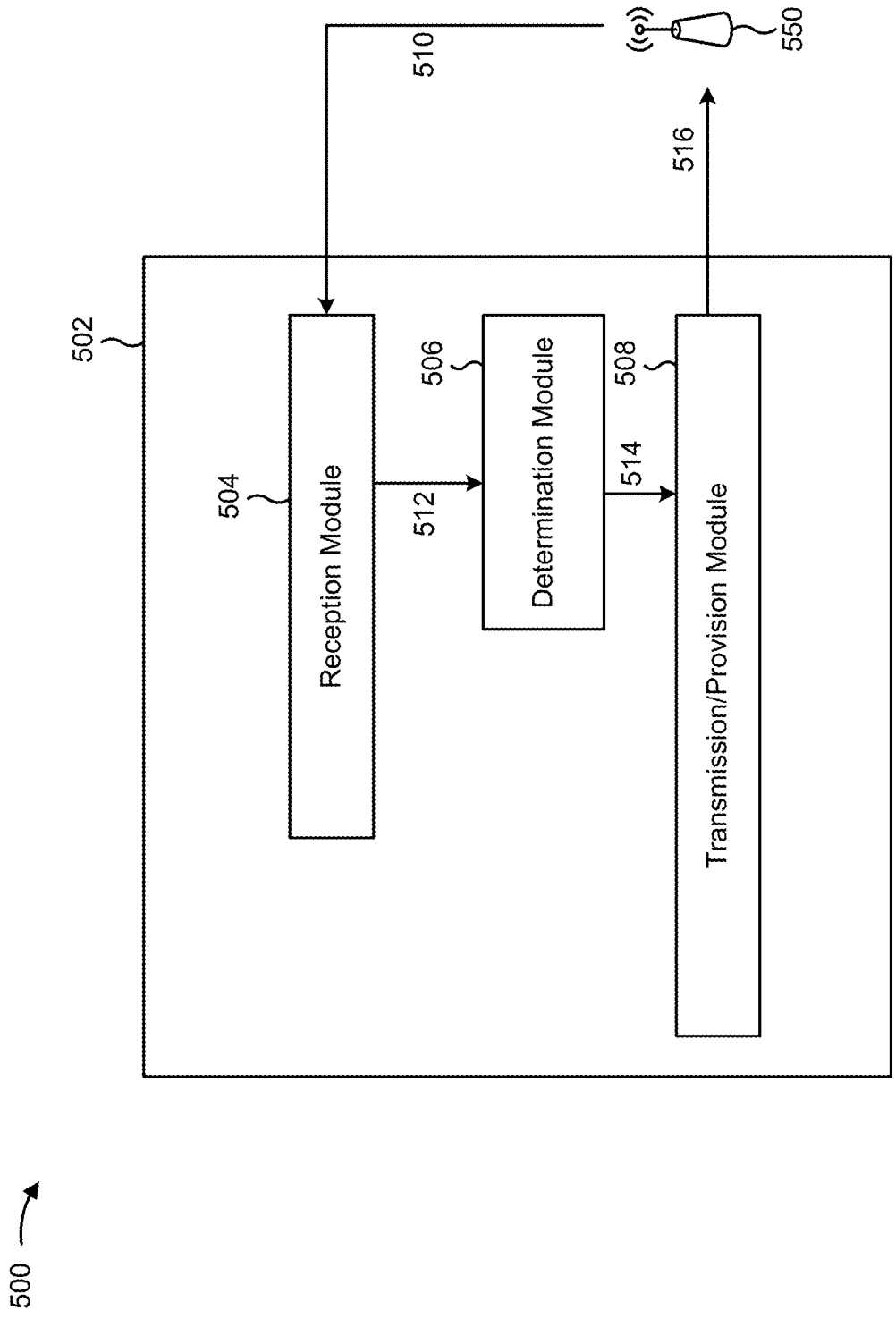
FIG. 5 is a conceptual data flow diagram illustrating the data flow between different modules/means/components in an example apparatus.

FIG. 5 is a conceptual data flow diagram 500 illustrating data flow between different modules/means/components in an example apparatus 502. The apparatus 502 may be a network device. In some aspects, the apparatus 502 includes a reception module 504, a determination module 506, and/or a transmission/provision module 508.

Reception module 504 may receive signals 510 from wireless communication device 550 (e.g., UE 120 or BS 110, such as via a wireless or wired connection). In some aspects, the signals 510 may include an attach request message, a tracking area update request message, an indication that a UE supports WUS sub-grouping, and/or the like. Reception module 504 may provide data 512 to determination module 506 based at least in part on the signals 510. The data 512 may include the indication that a UE supports WUS sub-grouping and/or the like.

Determination module 506 may determine an assignment of a UE to a WUS sub-group, a mapping of a set of network device-level WUS sub-groups to a set of base station-level WUS sub-groups, and/or the like. Determination module 506 may provide data 514 to transmission/provision module 508 based at least in part on these determinations.

Transmission/provision module 508 may transmit or provide information 516 (via a wired or wireless connection) identifying a set of WUS sub-groups for a base station, information identifying an assignment of a UE to a WUS sub-group, an indication that a WUS sub-group is to receive a WUS, information identifying a mapping, and/or the like.

The apparatus may include additional modules that perform each of the blocks of the algorithm in the aforementioned method 400 of FIG. 4 and/or the like. Each block in the aforementioned method 400 of FIG. 4 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
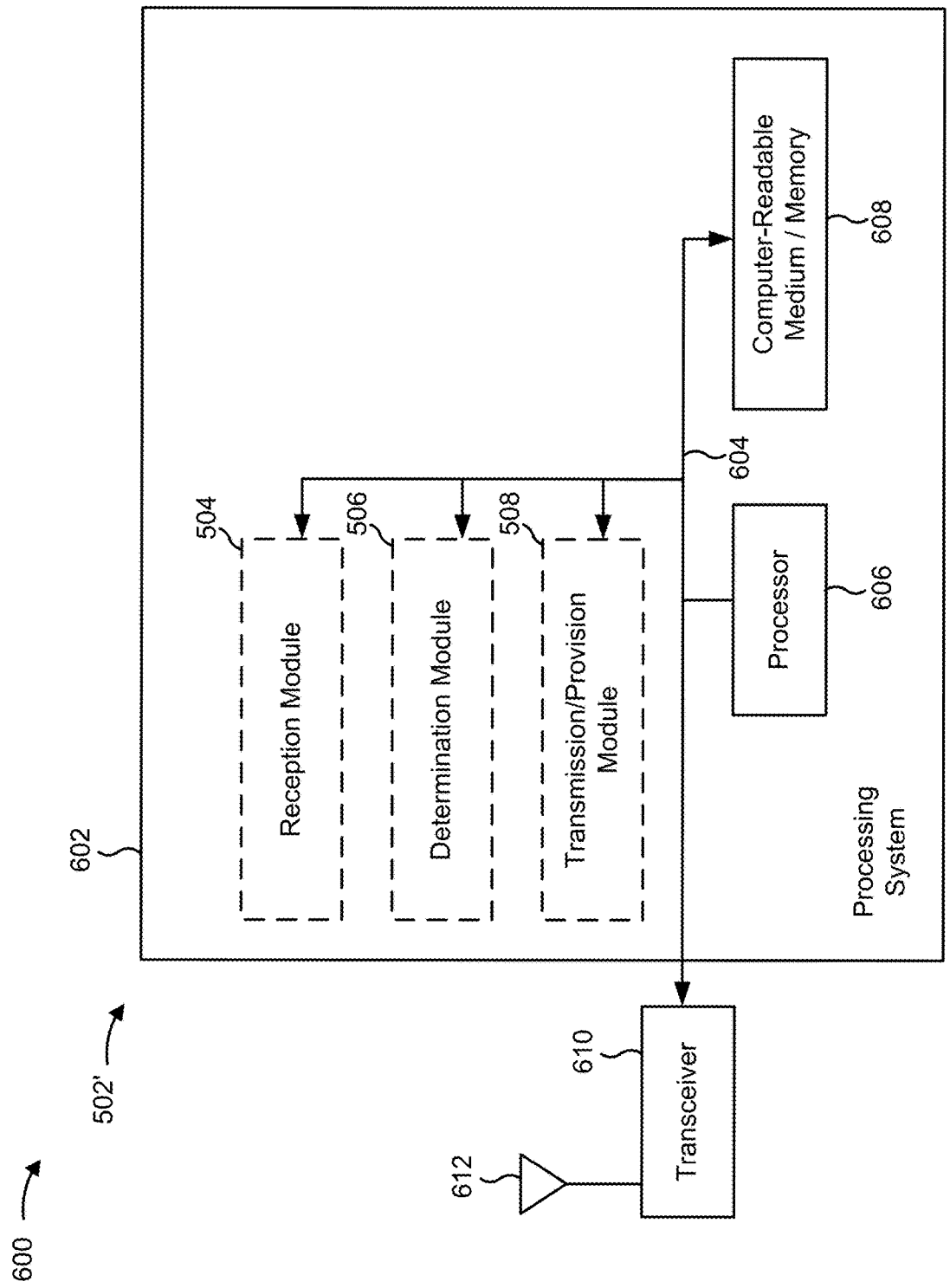
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be a network device.

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium (a wired or wireless medium). The transceiver 610 receives a signal from the one or more antennas 612, extracts information from the received signal, and provides the extracted information to the processing system 602, specifically the reception module 504. In addition, the transceiver 610 receives information from the processing system 602, specifically the transmission/provision module 508, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, and 508. The modules may be software modules running in the processor 606, resident/stored in the computer-readable medium/memory 608, one or more hardware modules coupled to the processor 606, or some combination thereof. The processing system 602 may be a component of the network device or network controller 130 and may include a memory (e.g., memory 242/292) and/or a controller/processor (e.g., the controller/processor 240/280/290).

In some aspects, the apparatus 502/502' for wireless communication includes means for providing, to a base station, information identifying a set of wakeup signal (WUS) sub-groups for wakeup signaling by the base station; means for providing, to a UE and based at least in part on receiving an indication that the UE supports WUS sub-grouping, information identifying an assignment of the UE to a WUS sub-group of the set of WUS sub-groups; means for providing, to the base station, an indication that the WUS sub-group is to receive a WUS based at least in part on the assignment and paging to be performed for the UE; means for determining a mapping of the set of network device-level WUS sub-groups to the set of base station-level WUS sub-groups, wherein the information identifying the set of WUS sub-groups for wakeup signaling is based at least in part on the mapping; means for providing information to the base station identifying the mapping; means for determining the assignment of the UE to the WUS sub-group; and/or the like. The aforementioned means may be one or more of the aforementioned modules of the apparatus 502 and/or the processing system 602 of the apparatus 502' configured to perform the functions recited by the aforementioned means. As described elsewhere herein, the processing system 602 may include a controller/processor (e.g., the controller/ processor 240/280/290). In one configuration, the aforementioned means may be the TX MIMO processor 230, the receive processor 238, and/or the controller/processor 240/280/290 configured to perform the functions and/or operations recited herein.

FIG. 6 is provided as an example. Other examples may differ from what is described in connection with FIG. 6.

Figure 7:
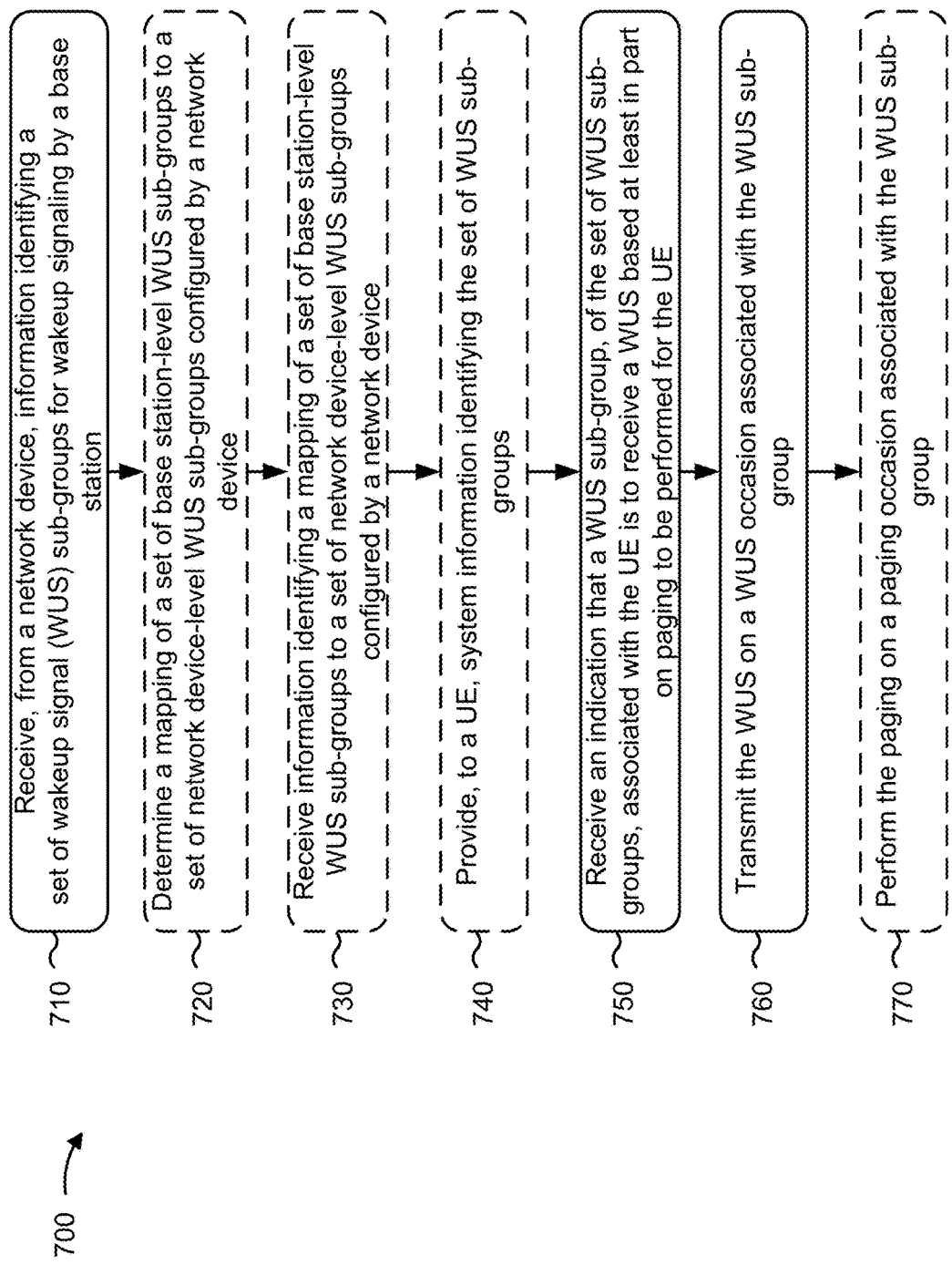
FIG. 7 is a flow chart of a method of wireless communication.

FIG. 7 is a flow chart of a method 700 of wireless communication. The method may be performed by a base station (e.g., the BS 110 of FIG. 1, the BS of FIG. 3, the apparatus 802/802', and/or the like).

At 710, the base station may receive, from a network device, information identifying a set of wakeup signal (WUS) sub-groups for wakeup signaling by a base station. For example, the base station (e.g., using antenna 234, DEMOD 232, MIMO detector 236, receive processor 238, controller/processor 240, and/or the like) may receive information identifying a set of WUS sub-groups from a network device.

At 720, the base station may optionally determine a mapping of a set of base station-level WUS sub-groups to a set of network device-level WUS sub-groups configured by a network device. For example, in some aspects, the base station (e.g., using controller/processor 240 and/or the like) may determine a mapping of a set of BS-level WUS sub-groups to a set of network device-level WUS sub-groups (e.g., MME-level WUS sub-groups). In such a case, the base station may determine the mapping based at least in part on a rule. For example, in some aspects, the network device may provide an indication of which rule is to be used, and the base station may use the rule accordingly. In some aspects, the rule may be static or may be specified in a standard.

At 730, the base station may optionally receive information identifying a mapping of a set of base station-level WUS sub-groups to a set of network device-level WUS sub-groups configured by a network device. For example, in some aspects, the base station (e.g., using antenna 234, DEMOD 232, MIMO detector 236, receive processor 238, controller/processor 240, and/or the like) may receive information identifying the mapping. In this case, the network device may determine the mapping and may provide information identifying the mapping to the base station.

At 740, the base station may optionally provide, to a UE, system information identifying the set of WUS sub-groups. For example, the base station (e.g., using controller/processor 240, transmit processor 220, TX MIMO processor 230, MOD 232, antenna 234, and/or the like) may provide system information (e.g., a system information block) that identifies the set of WUS sub-groups configured for the base station. This may conserve signaling resources that would otherwise be used to provide an MME-to-UE signaling of the set of WUS sub-groups, since the MME may cover many base stations that may be associated with different sets of WUS sub-groups. In some aspects, the system information identifies a mapping of a set of base station-level WUS sub-groups to a set of network device-level WUS sub-groups configured by a network device.

At 750, the base station may receive an indication that a WUS sub-group, of the set of WUS sub-groups, associated with the UE is to receive a WUS based at least in part on paging to be performed for the UE. For example, the base station (e.g., using antenna 234, DEMOD 232, MIMO detector 236, receive processor 238, controller/processor 240, and/or the like) may receive an indication that a WUS sub-group associated with the UE is to receive a WUS based at least in part on paging to be performed for the UE. In some aspects, the WUS sub-group is one of the set of base station-level WUS sub-groups. In some aspects, the WUS sub-group is one of the set of network device-level WUS sub-groups. In some aspects, the indication that the WUS sub-group associated with the UE is to receive the WUS includes information identifying the UE. In some aspects, the WUS sub-group is a network device-level WUS sub-group that is mapped to two or more base station-level WUS sub-groups.

At 760, the base station may transmit the WUS on a WUS occasion associated with a selected base station-level WUS sub-group. For example, the base station (e.g., using controller/processor 240, transmit processor 220, TX MIMO processor 230, MOD 232, antenna 234, and/or the like) may transmit the WUS on a WUS occasion associated with a selected base station-level WUS sub-group. The selected base station-level WUS sub-group may be selected from the two or more base station-level WUS sub-groups in accordance with the mapping.

At 770, the base station may optionally perform the paging on a paging occasion associated with the WUS sub-group. For example, the base station (e.g., using controller/processor 240, transmit processor 220, TX MIMO processor 230, MOD 232, antenna 234, and/or the like) may perform the paging on a paging occasion associated with the WUS sub-group. In some aspects, the base station may perform the paging based at least in part on the indication that includes information identifying the UE. For example, the base station may generate and/or transmit a paging message based at least in part on a UE identifier of the UE.

Method 700 may include additional aspects, such as any single aspect or any combination of aspects described above or below and/or in connection with one or more other processes described elsewhere herein.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
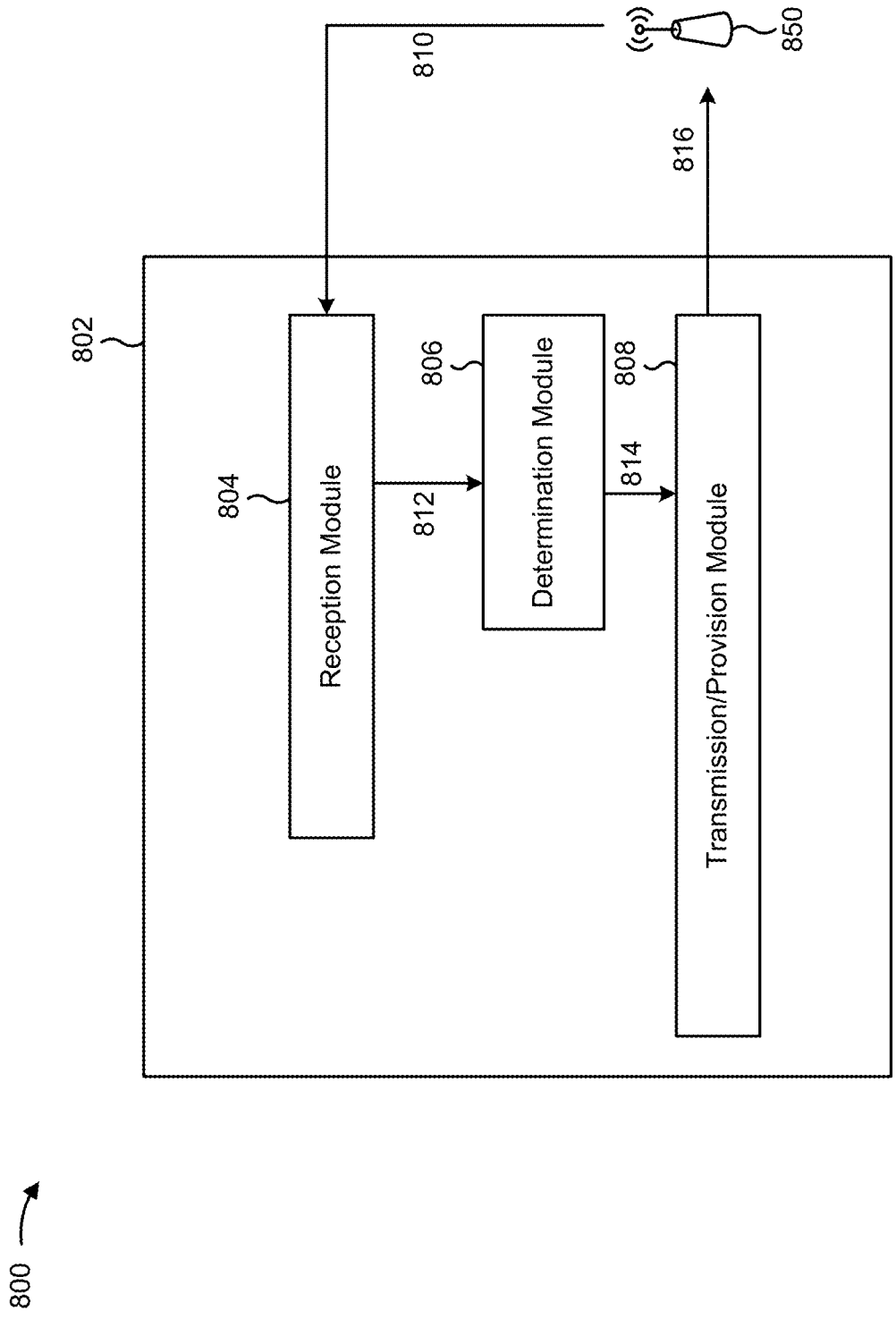
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a base station. In some aspects, the apparatus 802 includes a reception module 804, a determination module 806, and/or a transmission/provision module 808.

Reception module 804 may receive, from device 850 (e.g., a network device, a UE, and/or the like), signals 810 identifying a set of WUS sub-groups, information identifying a mapping of BS-level WUS sub-groups to a set of network device-level WUS sub-groups, an indication that a WUS sub-group associated with a UE is to receive a WUS, and/or the like. Reception module 804 may provide data 812 to determination module 806 based at least in part on the signals 810.

Determination module 806 may determine, based at least in part on the data 812, a mapping of a set of BS-level WUS sub-groups to a set of network device-level WUS sub-groups, a BS-level WUS sub-group based at least in part on the mapping and information identifying a network device-level WUS sub-group, and/or the like. Determination module 806 may provide data 814 to transmission/provision module 808 based at least in part on the data 812. The data 814 may identify, for example, system information to be provided to a UE, a wakeup signal to be transmitted, a paging message to be transmitted, and/or the like.

Transmission/provision module 808 may provide or transmit data 816 based at least in part on the data 814. For example, transmission/provision module 808 may transmit or provide system information identifying a set of WUS sub-groups, a WUS on a WUS occasion, a paging message on a paging occasion, and/or the like.

The apparatus may include additional modules that perform each of the blocks of the algorithm in the aforementioned method 700 of FIG. 7 and/or the like. Each block in the aforementioned method 700 of FIG. 7 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
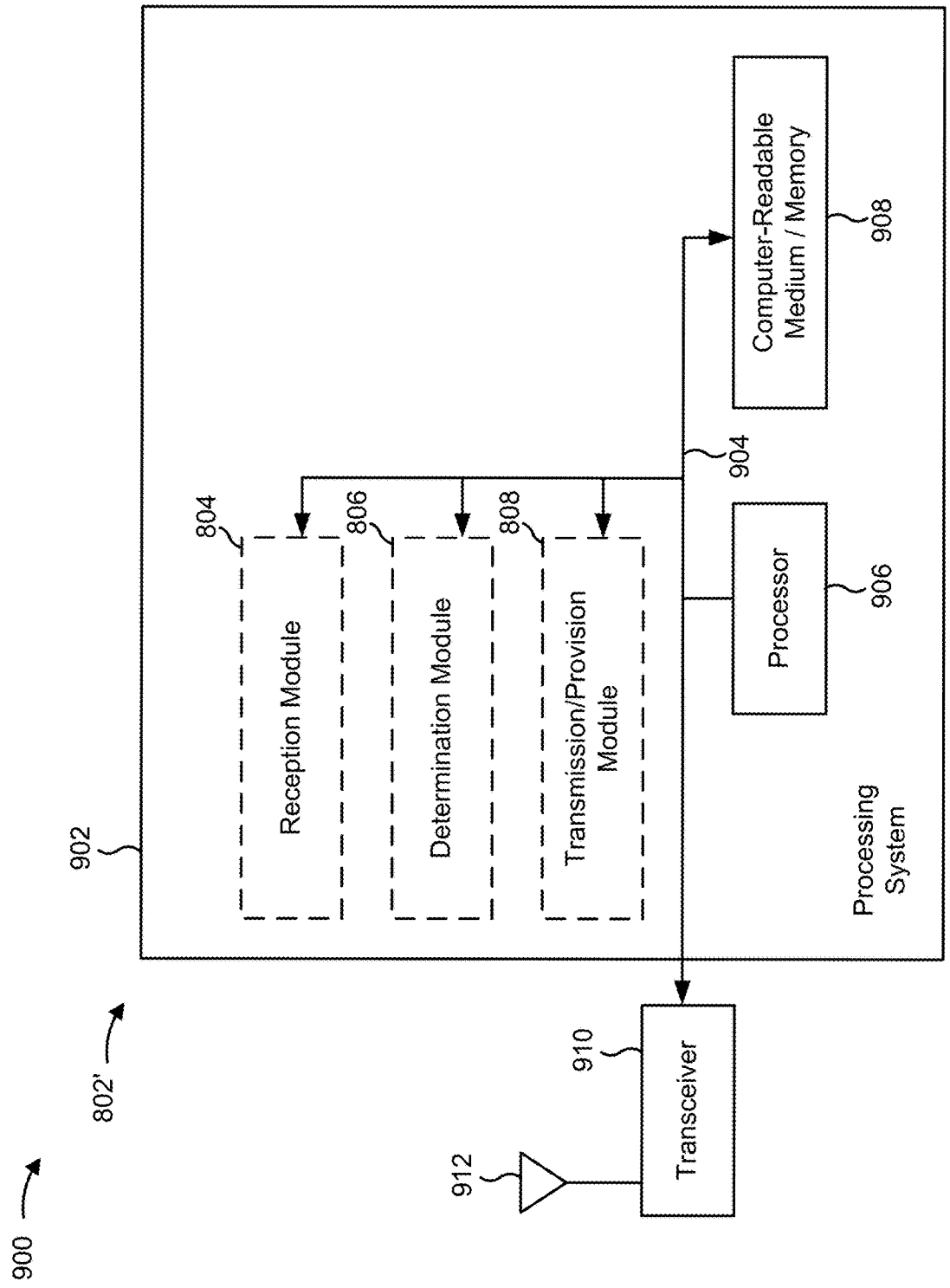
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a base station such as an eNB.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission/provision module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer-readable medium/memory 908, one or more hardware modules coupled to the processor 906, or some combination thereof. The processing system 902 may be a component of the eNB 110 and may include the memory 242 and/or at least one of the TX MIMO processor 230, the RX processor 238, and/or the controller/processor 240.

In some aspects, the apparatus 802/802' for wireless communication includes means for receiving, from a network device, information identifying a set of wakeup signal (WUS) sub-groups for wakeup signaling by the base station; means for transmitting the WUS on a WUS occasion associated with a selected base station-level WUS sub-group of the two or more base station-level WUS sub-groups in accordance with the mapping; means for receiving an indication that a UE supports WUS sub-grouping; means for providing, to the UE, system information identifying the set of WUS sub-groups; means for receiving an indication that a WUS sub-group, of the set of WUS sub-groups, associated with a UE is to receive a WUS based at least in part on paging to be performed for the UE; means for determining the mapping; means for receiving information identifying the mapping; means for performing the paging on a paging occasion associated with the WUS sub-group; and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

Figure 10:
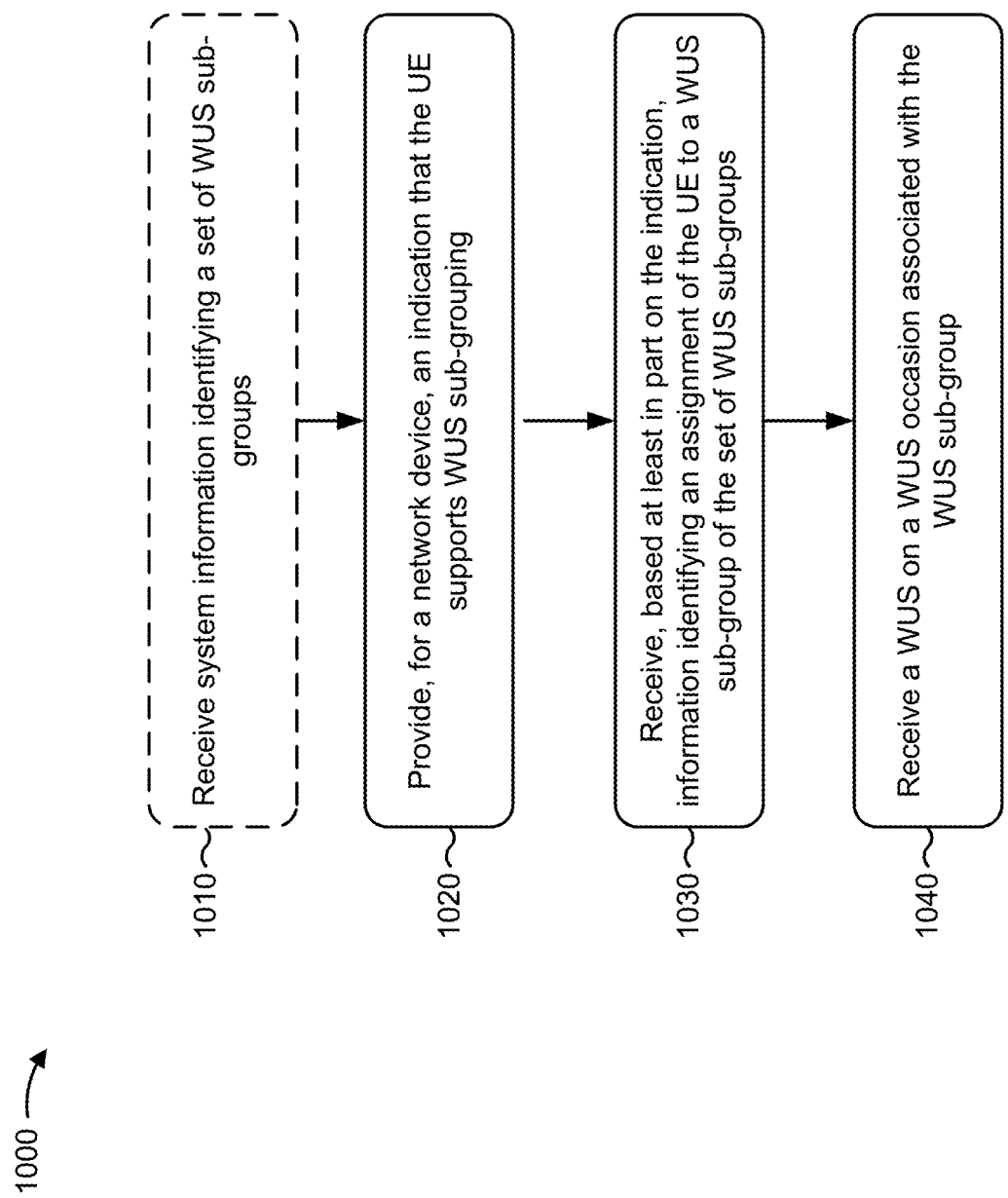
FIG. 10 is a flow chart of a method of wireless communication.

FIG. 10 is a flow chart of a method 1000 of wireless communication. The method may be performed by a UE (e.g., the UE 120 of FIG. 1, the UE of FIG. 3, the apparatus 1102/1102', and/or the like).

At 1010, the UE may optionally receive system information identifying a set of WUS sub-groups. For example, the UE (e.g., using antenna 252, DEMOD 254, MIMO detector 256, receive processor 258, controller/processor 280, and/or the like) may receive system information. The system information may identify a set of WUS sub-groups. In some aspects, the system information identifies a mapping of a set of base station-level WUS sub-groups to a set of network device-level WUS sub-groups configured by a network device.

At 1020, the UE may provide, for a network device, an indication that the UE supports WUS sub-grouping. For example, the UE (e.g., using controller/processor 280, transmit processor 264, TX MIMO processor 266, MOD 254, antenna 252, and/or the like) may provide an indication that the UE supports WUS sub-grouping. The UE may provide the indication for a network device (e.g., to the network device and/or via another device such as a base station). In some aspects, the indication that the UE supports WUS sub-grouping is provided in an attach request message or a tracking area update request message.

At 1030, the UE may receive, based at least in part on the indication, information identifying an assignment of the UE to a WUS sub-group of a set of WUS sub-groups. For example, the UE (e.g., using antenna 252, DEMOD 254, MIMO detector 256, receive processor 258, controller/processor 280, and/or the like) may receive information identifying an assignment of the UE to a WUS sub-group of the set of WUS sub-groups identified by the system information. In some aspects, the WUS sub-group is one of the set of base station-level WUS sub-groups. In some aspects, the WUS sub-group is one of the set of network device-level WUS sub-groups. In some aspects, the information identifying the assignment is received in an attach accept message or a tracking area update accept message. In some aspects, the WUS sub-group is a network device-level WUS sub-group that is associated with a mapping to a base station-level WUS sub-group.

At 1040, the UE may receive a WUS on a WUS occasion associated with the WUS sub-group. For example, the UE (e.g., using antenna 252, DEMOD 254, MIMO detector 256, receive processor 258, controller/processor 280, and/or the like) may receive a WUS on a WUS occasion associated with the WUS sub-group. In some aspects, the UE may monitor paging on a paging occasion based at least in part on receiving the WUS on the WUS occasion. In some aspects, the UE may receive a WUS on a WUS occasion associated with the base station-level WUS sub-group based at least in part on the mapping.

Method 1000 may include additional aspects, such as any single aspect or any combination of aspects described above and/or in connection with one or more other processes described elsewhere herein.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
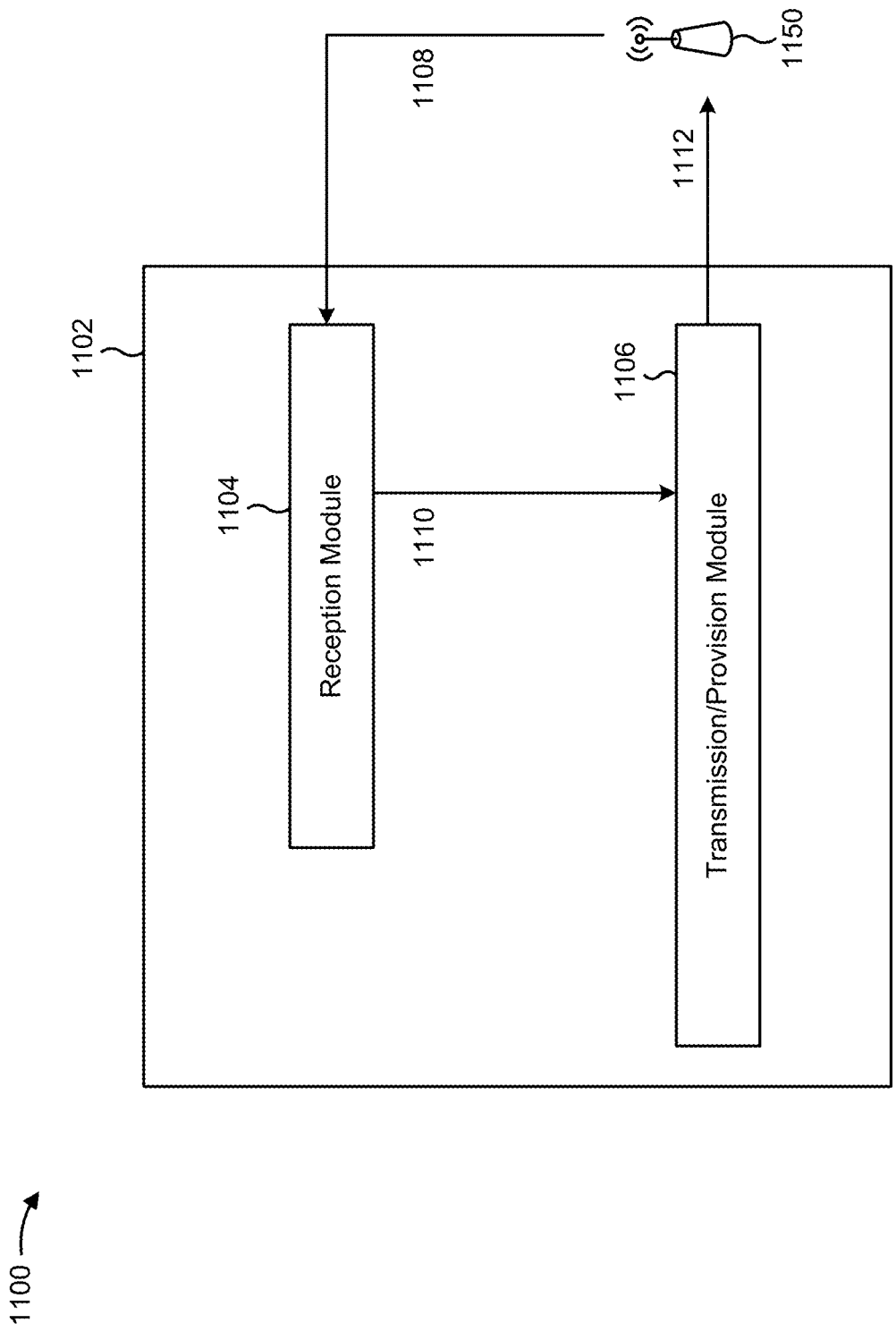
FIG. 11 is a conceptual data flow diagram illustrating the data flow between different modules/means/components in an example apparatus.

FIG. 11 is a conceptual data flow diagram 1100 illustrating data flow between different modules/means/components in an example apparatus 1102. The apparatus 1102 may be a UE. In some aspects, the apparatus 1102 includes a reception module 1104 and/or a transmission/provision module 1106.

Reception module 1104 may receive signals 1108 from a device 1150 (e.g., a network device, a base station, and/or the like). The signals 1108 may identify system information identifying a set of WUS sub-groups, information identifying an assignment of the UE to a WUS sub-group of the set of WUS sub-groups, a WUS on a WUS occasion associated with the WUS sub-group, a paging message, and/or the like. The reception module 1104 may provide data 1110 to the transmission/provision module 1106. Transmission/provision module 1106 may transmit or provide signals 1112 comprising an indication that the UE supports WUS sub-grouping, and/or the like.

The apparatus may include additional modules that perform each of the blocks of the algorithm in the aforementioned method 1000 of FIG. 10 and/or the like. Each block in the aforementioned method 1000 of FIG. 10 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
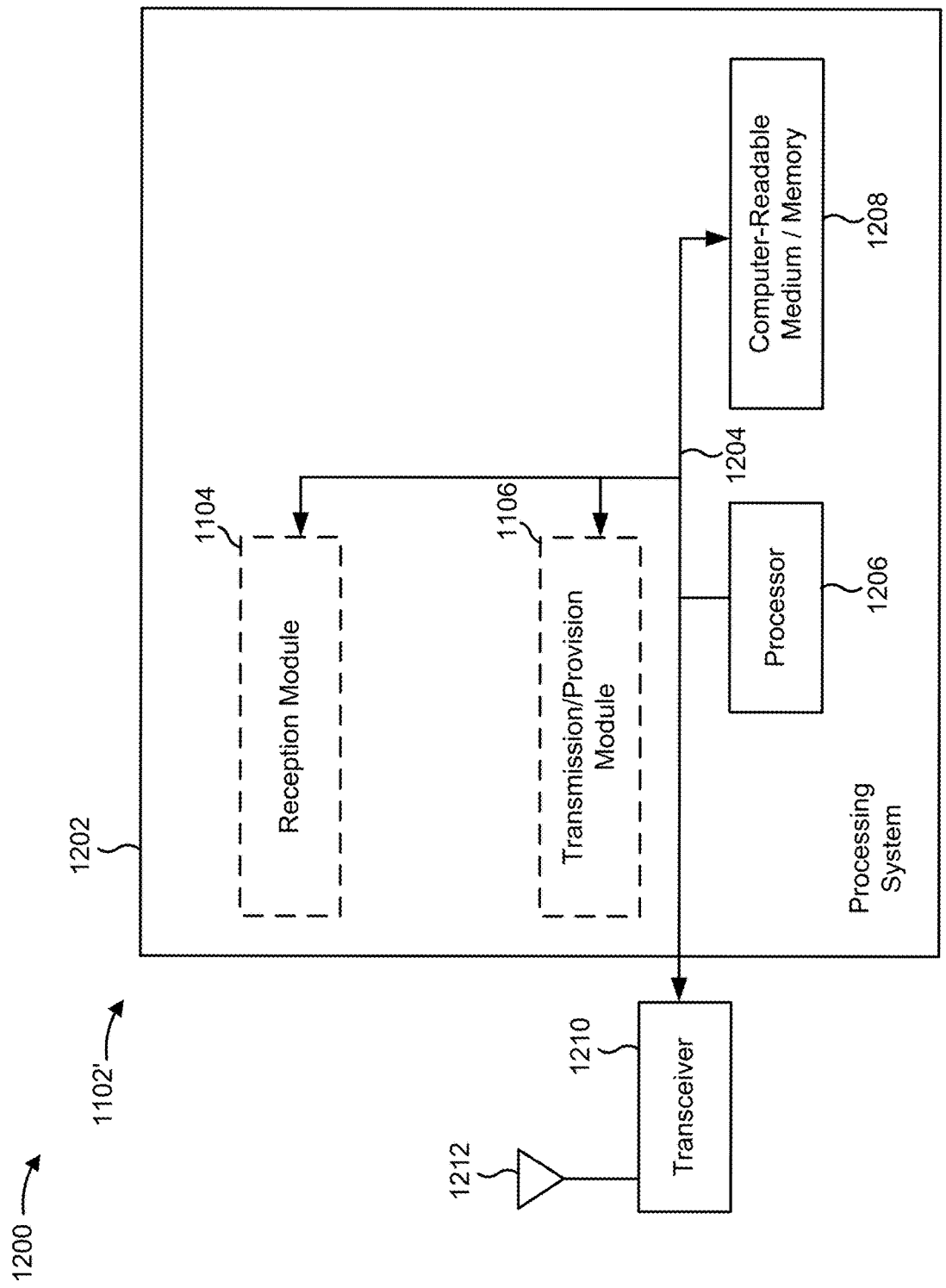
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission/provision module 1106, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the modules 1104 and 1106. The modules may be software modules running in the processor 1206, resident/stored in the computer-readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for providing, for a network device, an indication that the UE supports wakeup signal (WUS) sub-grouping; means for receiving, based at least in part on the indication, information identifying an assignment of the UE to a WUS sub-group of a set of WUS sub-groups; means for receiving a WUS on a WUS occasion associated with the base station-level WUS sub-group based at least in part on the mapping; means for receiving system information identifying the set of WUS sub-groups; and/or the like.

The aforementioned means may be one or more of the aforementioned modules of the apparatus 1102 and/or the processing system 1202 of the apparatus 1102' configured to perform the functions recited by the aforementioned means. As described elsewhere herein, the processing system 1202 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

It is to be understood that the specific order or hierarchy of blocks in the processes/flow charts disclosed is an illustration of example approaches. Based upon design preferences, it is to be understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a network device, comprising:
    providing, to a base station, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
    receiving an indication that a user equipment (UE) supports WUS sub-grouping;
    providing, to the UE and based at least in part on receiving the indication that the UE supports WUS sub-grouping, information identifying an assignment of the UE to a WUS sub-group of the set of WUS sub-groups; and
    providing, to the base station, an indication that the WUS sub-group to which the UE is assigned is to receive a WUS based at least in part on the assignment and on paging to be performed for the UE.

2. The method of claim 1, wherein the set of network device-level WUS sub-groups is different than the set of base station-level WUS sub-groups.

3. The method of claim 1, wherein the indication, that the WUS sub-group is to receive the WUS, identifies a base station-level WUS sub-group of the set of base station-level WUS sub-groups.

4. The method of claim 1, wherein the indication, that the WUS sub-group is to receive the WUS, identifies a network device-level WUS sub-group of the set of network device-level WUS sub-groups.

5. The method of claim 1, wherein the assignment indicates a base station-level WUS sub-group of the set of base station-level WUS sub-groups.

6. The method of claim 1, wherein the assignment indicates a network device-level WUS sub-group of the set of network device-level WUS sub-groups.

7. The method of claim 1, wherein information, identifying the mapping of the set of base station-level WUS sub-groups to the set of network device-level WUS sub-groups, is provided to the UE.

8. The method of claim 1, wherein the indication that the UE supports WUS sub-grouping is received in an attach request message or a tracking area update request message.

9. The method of claim 1, wherein the information identifying the assignment is provided in an attach accept message or a tracking area update accept message.

10. The method of claim 1, further comprising:
    determining the assignment of the UE to the WUS sub-group.

11. The method of claim 10, wherein determining the assignment of the UE to the WUS sub-group is based at least in part on a frequency of occurrence of paging associated with the UE.

12. The method of claim 1, wherein the set of WUS sub-groups correspond to a plurality of WUS occasions.

13. A method of wireless communication performed by a base station, comprising:
    receiving, from a network device, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
    receiving an indication that a WUS sub-group, of the set of WUS sub-groups, associated with a user equipment (UE) is to receive a WUS based at least in part on paging to be performed for the UE, wherein the WUS sub-group is a network device-level WUS sub-group that is mapped to two or more base station-level WUS sub-groups; and
    transmitting the WUS on a WUS occasion associated with a selected base station-level WUS sub-group of the two or more base station-level WUS sub-groups in accordance with the mapping.

14. The method of claim 13, further comprising:
    providing, to the UE, system information identifying the set of WUS sub-groups.

15. The method of claim 14, wherein the system information identifies the mapping of the set of base station-level WUS sub-groups to the set of network device-level WUS sub-groups.

16. The method of claim 14, wherein the system information indicates an assignment of the UE to the WUS sub-group.

17. The method of claim 13, wherein the indication that the WUS sub-group associated with the UE is to receive the WUS includes information identifying the UE.

18. The method of claim 13, wherein the indication that the WUS sub-group associated with the UE is to receive the WUS includes information identifying the network device-level WUS sub-group.

19. The method of claim 13, further comprising:
performing the paging on a paging occasion associated with the WUS sub-group.

20. A method of wireless communication performed by a user equipment (UE), comprising:
providing, for a network device, an indication that the UE supports wakeup signal (WUS) sub-grouping;
receiving, based at least in part on the indication, information identifying an assignment of the UE to a WUS sub-group of a set of WUS sub-groups, wherein the WUS sub-group is a network device-level WUS sub-group that is associated with a mapping to a base station-level WUS sub-group; and
receiving a WUS on a WUS occasion associated with the base station-level WUS sub-group based at least in part on the mapping.

21. The method of claim 20, further comprising:
receiving system information identifying the set of WUS sub-groups or the assignment.

22. The method of claim 20, wherein the WUS sub-group is included in a set of base station-level WUS sub-groups.

23. The method of claim 20, wherein the WUS sub-group is included in a set of network device-level WUS sub-groups.

24. The method of claim 20, wherein the WUS sub-group is included in a plurality of base station-level WUS sub-groups associated with a plurality of network device-level WUS sub-groups, and wherein the WUS sub-group is selected based at least in part on an identifier of the UE.

25. The method of claim 20, wherein the indication that the UE supports WUS sub-grouping is provided in a registration message or a registration update message.

26. The method of claim 20, wherein the information identifying the assignment is received in an attach accept message or a tracking area update accept message.

27. A network device for wireless communication, comprising:
a memory; and
one or more processors coupled to the memory, the memory and the one or more processors configured to:
provide, to a base station, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
receive an indication that a user equipment (UE) supports WUS sub-grouping;
provide, to the UE and based at least in part on receiving the indication that the UE supports WUS sub-grouping, information identifying an assignment of the UE to a WUS sub-group of the set of WUS sub-groups; and
provide, to the base station, an indication that the WUS sub-group to which the UE is assigned is to receive a WUS based at least in part on the assignment and on paging to be performed for the UE.

28. The network device of claim 27, wherein the set of network device-level WUS sub-groups is different than the set of base station-level WUS sub-groups.

29. The network device of claim 27, wherein the indication, that the WUS sub-group is to receive the WUS, identifies a base station-level WUS sub-group of the set of base station-level WUS sub-groups.

30. The network device of claim 27, wherein the indication, that the WUS sub-group is to receive the WUS, identifies a network device-level WUS sub-group of the set of network device-level WUS sub-groups.

31. The network device of claim 27, wherein the assignment indicates a base station-level WUS sub-group of the set of base station-level WUS sub-groups.

32. The network device of claim 27, wherein the assignment indicates a network device-level WUS sub-group of the set of network device-level WUS sub-groups.

33. The network device of claim 27, wherein information, identifying the mapping of the set of base station-level WUS sub-groups to the set of network device-level WUS sub-groups, is provided to the UE.

34. The network device of claim 27, wherein the indication that the UE supports WUS sub-grouping is received in an attach request message or a tracking area update request message.

35. The network device of claim 27, wherein the information identifying the assignment is provided in an attach accept message or a tracking area update accept message.

36. The network device of claim 27, wherein the one or more processors are further configured to:
determine the assignment of the UE to the WUS sub-group.

37. The network device of claim 36, wherein determining the assignment of the UE to the WUS sub-group is based at least in part on a frequency of occurrence of paging associated with the UE.

38. The network device of claim 27, wherein the set of WUS sub-groups correspond to a plurality of WUS occasions.

39. A base station for wireless communication, comprising:
a memory; and
one or more processors coupled to the memory, the memory and the one or more processors configured to:
receive, from a network device, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
receive an indication that a WUS sub-group, of the set of WUS sub-groups, associated with a user equipment (UE) is to receive a WUS based at least in part on paging to be performed for the UE, wherein the WUS sub-group is a network device-level WUS sub-group that is mapped to two or more base station-level WUS sub-groups; and
transmit the WUS on a WUS occasion associated with a selected base station-level WUS sub-group of the two or more base station-level WUS sub-groups in accordance with the mapping.

40. The base station of claim 39, wherein the one or more processors are further configured to:
provide, to the UE, system information identifying the set of WUS sub-groups.

41. The base station of claim 40, wherein the system information identifies the mapping of the set of base station-level WUS sub-groups to the set of network device-level WUS sub-groups.

42. The base station of claim 40, wherein the system information indicates an assignment of the UE to the WUS sub-group.

43. The base station of claim 39, wherein the indication that the WUS sub-group associated with the UE is to receive the WUS includes information identifying the UE.

44. The base station of claim 39, wherein the indication that the WUS sub-group associated with the UE is to receive the WUS includes information identifying the network device-level WUS sub-group.

45. The base station of claim 39, wherein the one or more processors are further configured to:
perform the paging on a paging occasion associated with the WUS sub-group.

46. A user equipment (UE) for wireless communication, comprising:
a memory; and
one or more processors coupled to the memory, the memory and the one or more processors configured to:
provide, for a network device, an indication that the UE supports wakeup signal (WUS) sub-grouping;
receive, based at least in part on the indication, information identifying an assignment of the UE to a WUS sub-group of a set of WUS sub-groups, wherein the WUS sub-group is a network device-level WUS sub-group that is associated with a mapping to a base station-level WUS sub-group; and
receive a WUS on a WUS occasion associated with the base station-level WUS sub-group based at least in part on the mapping.

47. The UE of claim 46, wherein the one or more processors are further configured to:
receive system information identifying the set of WUS sub-groups or the assignment.

48. The UE of claim 46, wherein the WUS sub-group is included in a set of base station-level WUS sub-groups.

49. The UE of claim 46, wherein the WUS sub-group is included in a set of network device-level WUS sub-groups.

50. The UE of claim 46, wherein the WUS sub-group is included in a plurality of base station-level WUS sub-groups associated with a plurality of network device-level WUS sub-groups, and wherein the WUS sub-group is selected based at least in part on an identifier of the UE.

51. The UE of claim 46, wherein the indication that the UE supports WUS sub-grouping is provided in a registration message or a registration update message.

52. The UE of claim 46, wherein the information identifying the assignment is received in an attach accept message or a tracking area update accept message.

53. A non-transitory computer-readable medium storing a set of instructions for wireless communication, the set of instructions comprising:
one or more instructions that, when executed by one or more processors of a network device, cause the network device to:
provide, to a base station, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
receive an indication that a user equipment (UE) supports WUS sub-grouping;
provide, to the UE and based at least in part on receiving the indication that the UE supports WUS sub-grouping, information identifying an assignment of the UE to a WUS sub-group of the set of WUS sub-groups; and
provide, to the base station, an indication that the WUS sub-group to which the UE is assigned is to receive a WUS based at least in part on the assignment and on paging to be performed for the UE.

54. The non-transitory computer-readable medium of claim 53, wherein the set of network device-level WUS sub-groups is different than the set of base station-level WUS sub-groups.

55. The non-transitory computer-readable medium of claim 53, wherein the indication, that the WUS sub-group is to receive the WUS, identifies a base station-level WUS sub-group of the set of base station-level WUS sub-groups.

56. The non-transitory computer-readable medium of claim 53, wherein the indication, that the WUS sub-group is to receive the WUS, identifies a network device-level WUS sub-group of the set of network device-level WUS sub-groups.

57. The non-transitory computer-readable medium of claim 53, wherein the assignment indicates a base station-level WUS sub-group of the set of base station-level WUS sub-groups.

58. The non-transitory computer-readable medium of claim 53, wherein the assignment indicates a network device-level WUS sub-group of the set of network device-level WUS sub-groups.

59. The non-transitory computer-readable medium of claim 53, wherein information, identifying the mapping of the set of base station-level WUS sub-groups to the set of network device-level WUS sub-groups, is provided to the UE.

60. The non-transitory computer-readable medium of claim 53, wherein the indication that the UE supports WUS sub-grouping is received in an attach request message or a tracking area update request message.

61. The non-transitory computer-readable medium of claim 53, wherein the information identifying the assignment is provided in an attach accept message or a tracking area update accept message.

62. The non-transitory computer-readable medium of claim 53, wherein the one or more instructions further cause the network device to:
determine the assignment of the UE to the WUS sub-group.

63. The non-transitory computer-readable medium of claim 62, wherein determining the assignment of the UE to the WUS sub-group is based at least in part on a frequency of occurrence of paging associated with the UE.

64. The non-transitory computer-readable medium of claim 53, wherein the set of WUS sub-groups correspond to a plurality of WUS occasions.

65. A non-transitory computer-readable medium storing a set of instructions for wireless communication, the set of instructions comprising:

one or more instructions that, when executed by one or more processors of a base station, cause the base station to:
- receive, from a network device, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
- receive an indication that a WUS sub-group, of the set of WUS sub-groups, associated with a user equipment (UE) is to receive a WUS based at least in part on paging to be performed for the UE, wherein the WUS sub-group is a network device-level WUS sub-group that is mapped to two or more base station-level WUS sub-groups; and
- transmit the WUS on a WUS occasion associated with a selected base station-level WUS sub-group of the two or more base station-level WUS sub-groups in accordance with the mapping.

66. The non-transitory computer-readable medium of claim 65, wherein the one or more instructions further cause the base station to:
provide, to the UE, system information identifying the set of WUS sub-groups.

67. The non-transitory computer-readable medium of claim 66, wherein the system information identifies the mapping of the set of base station-level WUS sub-groups to the set of network device-level WUS sub-groups.

68. The non-transitory computer-readable medium of claim 66, wherein the system information indicates an assignment of the UE to the WUS sub-group.

69. The non-transitory computer-readable medium of claim 65, wherein the indication that the WUS sub-group associated with the UE is to receive the WUS includes information identifying the UE.

70. The non-transitory computer-readable medium of claim 65, wherein the indication that the WUS sub-group associated with the UE is to receive the WUS includes information identifying the network device-level WUS sub-group.

71. The non-transitory computer-readable medium of claim 65, wherein the one or more instructions further cause the base station to:
perform the paging on a paging occasion associated with the WUS sub-group.

72. A non-transitory computer-readable medium storing one or more instructions for wireless communication, the one or more instructions comprising:
one or more instructions that, when executed by one or more processors of a user equipment (UE), cause the UE to:
- provide, for a network device, an indication that the UE supports wakeup signal (WUS) sub-grouping;
- receive, based at least in part on the indication, information identifying an assignment of the UE to a WUS sub-group of a set of WUS sub-groups, wherein the WUS sub-group is a network device-level WUS sub-group that is associated with a mapping to a base station-level WUS sub-group; and
- receive a WUS on a WUS occasion associated with the base station-level WUS sub-group based at least in part on the mapping.

73. The non-transitory computer-readable medium of claim 72, wherein the one or more instructions further cause the UE to:
receive system information identifying the set of WUS sub-groups or the assignment.

74. The non-transitory computer-readable medium of claim 72, wherein the WUS sub-group is included in a set of base station-level WUS sub-groups.

75. The non-transitory computer-readable medium of claim 72, wherein the WUS sub-group is included in a set of network device-level WUS sub-groups.

76. The non-transitory computer-readable medium of claim 72, wherein the WUS sub-group is included in a plurality of base station-level WUS sub-groups associated with a plurality of network device-level WUS sub-groups, and wherein the WUS sub-group is selected based at least in part on an identifier of the UE.

77. The non-transitory computer-readable medium of claim 72, wherein the indication that the UE supports WUS sub-grouping is provided in a registration message or a registration update message.

78. The non-transitory computer-readable medium of claim 72, wherein the information identifying the assignment is received in an attach accept message or a tracking area update accept message.

79. An apparatus for wireless communication, comprising:
- means for providing, to a base station, information identifying a set of wakeup signal (WUS) sub-groups for wakeup signaling by the base station, wherein the information identifying the set of WUS sub-groups identifies a mapping of a set of base station-level WUS sub-groups to a set of network device-level WUS sub-groups;
- means for receiving an indication that a user equipment (UE) supports WUS sub-grouping;
- means for providing, to the UE and based at least in part on receiving the indication that the UE supports WUS sub-grouping, information identifying an assignment of the UE to a WUS sub-group of the set of WUS sub-groups; and
- means for providing, to the base station, an indication that the WUS sub-group to which the UE is assigned is to receive a WUS based at least in part on the assignment and on paging to be performed for the UE.

80. The apparatus of claim 79, wherein the set of network device-level WUS sub-groups is different than the set of base station-level WUS sub-groups.

81. The apparatus of claim 79, wherein the indication, that the WUS sub-group is to receive the WUS, identifies a base station-level WUS sub-group of the set of base station-level WUS sub-groups.

82. The apparatus of claim 79, wherein the indication, that the WUS sub-group is to receive the WUS, identifies a network device-level WUS sub-group of the set of network device-level WUS sub-groups.

83. The apparatus of claim 79, wherein the assignment indicates a base station-level WUS sub-group of the set of base station-level WUS sub-groups.

84. The apparatus of claim 79, wherein the assignment indicates a network device-level WUS sub-group of the set of network device-level WUS sub-groups.

85. The apparatus of claim 79, wherein information, identifying the mapping of the set of base station-level WUS sub-groups to the set of network device-level WUS sub-groups, is provided to the UE.

86. The apparatus of claim 79, wherein the indication that the UE supports WUS sub-grouping is received in an attach request message or a tracking area update request message.

87. The apparatus of claim 79, wherein the information identifying the assignment is provided in an attach accept message or a tracking area update accept message.

88. The apparatus of claim 79, further comprising:
means for determining the assignment of the UE to the WUS sub-group.

89. The apparatus of claim 88, wherein determining the assignment of the UE to the WUS sub-group is based at least in part on a frequency of occurrence of paging associated with the UE.

90. The apparatus of claim 79, wherein the set of WUS sub-groups correspond to a plurality of WUS occasions.

91. An apparatus for wireless communication, comprising:
means for receiving, from a network device, information identifying a set of wakeup signal (WUS) sub-groups for wakeup signaling by the apparatus, wherein the information identifying the set of WUS sub-groups identifies a mapping of a set of base station-level WUS sub-groups to a set of network device-level WUS sub-groups;
means for receiving an indication that a WUS sub-group, of the set of WUS sub-groups, associated with a user equipment (UE) is to receive a WUS based at least in part on paging to be performed for the UE, wherein the WUS sub-group is a network device-level WUS sub-group that is mapped to two or more base station-level WUS sub-groups; and
means for transmitting the WUS on a WUS occasion associated with a selected base station-level WUS sub-group of the two or more base station-level WUS sub-groups in accordance with the mapping.

92. The apparatus of claim 91, further comprising:
means for providing, to the UE, system information identifying the set of WUS sub-groups.

93. The apparatus of claim 92, wherein the system information identifies the mapping of the set of base station-level WUS sub-groups to the set of network device-level WUS sub-groups.

94. The apparatus of claim 92, wherein the system information indicates an assignment of the UE to the WUS sub-group.

95. The apparatus of claim 91, wherein the indication that the WUS sub-group associated with the UE is to receive the WUS includes information identifying the UE.

96. The apparatus of claim 91, wherein the indication that the WUS sub-group associated with the UE is to receive the WUS includes information identifying the network device-level WUS sub-group.

97. The apparatus of claim 91, further comprising:
means for performing the paging on a paging occasion associated with the WUS sub-group.

98. An apparatus for wireless communication, comprising:
means for providing, for a network device, an indication that the apparatus supports wakeup signal (WUS) sub-grouping;
means for receiving, based at least in part on the indication, information identifying an assignment of the apparatus to a WUS sub-group of a set of WUS sub-groups, wherein the WUS sub-group is a network device-level WUS sub-group that is associated with a mapping to a base station-level WUS sub-group; and
means for receiving a WUS on a WUS occasion associated with the base station-level WUS sub-group based at least in part on the mapping.

99. The apparatus of claim 98, further comprising:
means for receiving system information identifying the set of WUS sub-groups or the assignment.

100. The apparatus of claim 98, wherein the WUS sub-group is included in a set of base station-level WUS sub-groups.

101. The apparatus of claim 98, wherein the WUS sub-group is included in a set of network device-level WUS sub-groups.

102. The apparatus of claim 98, wherein the WUS sub-group is included in a plurality of base station-level WUS sub-groups associated with a plurality of network device-level WUS sub-groups, and wherein the WUS sub-group is selected based at least in part on an identifier of the apparatus.

103. The apparatus of claim 98, wherein the indication that the apparatus supports WUS sub-grouping is provided in a registration message or a registration update message.

104. The apparatus of claim 98, wherein the information identifying the assignment is received in an attach accept message or a tracking area update accept message.

* * * * *